(12) United States Patent
Byun et al.

(10) Patent No.: US 10,743,333 B2
(45) Date of Patent: Aug. 11, 2020

(54) METHOD FOR DYNAMICALLY ALLOCATING RESOURCES TO FREQUENCY BAND OF SHORT TTI AND DEVICE USING SAME

(71) Applicant: LG ELECTRONICS INC., Seoul (KR)

(72) Inventors: Ilmu Byun, Seoul (KR); Heejeong Cho, Seoul (KR); Hyunsoo Ko, Seoul (KR); Genebeck Hahn, Seoul (KR); Eunjong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/556,360

(22) PCT Filed: Oct. 14, 2015

(86) PCT No.: PCT/KR2015/010854
§ 371 (c)(1),
(2) Date: Sep. 7, 2017

(87) PCT Pub. No.: WO2016/153137
PCT Pub. Date: Sep. 29, 2016

(65) Prior Publication Data
US 2018/0110062 A1    Apr. 19, 2018

Related U.S. Application Data

(60) Provisional application No. 62/135,717, filed on Mar. 20, 2015.

(51) Int. Cl.
*H04W 72/12* (2009.01)
*H04W 72/14* (2009.01)
(Continued)

(52) U.S. Cl.
CPC .......... *H04W 72/1257* (2013.01); *H04B 7/26* (2013.01); *H04J 1/04* (2013.01);
(Continued)

(58) Field of Classification Search
None
See application file for complete search history.

(56) References Cited

U.S. PATENT DOCUMENTS 7,286,501 B2    10/2007  Kwon et al.
2008/0101303 A1   5/2008  Kim
(Continued)

FOREIGN PATENT DOCUMENTS

CN    101119153 A    2/2008
CN    101682417 A    3/2010
(Continued)

OTHER PUBLICATIONS

Lucent, "Scheduled and Autonomous Mode Operation for the Enhanced Uplink," R1-030284, 3GPP TSG RAN WG1 #31, Tokyo, Japan, Feb. 17, 2003, see pp. 1-5.
(Continued)

*Primary Examiner* — Gregory B Sefcheck
*Assistant Examiner* — Suk Jin Kang
(74) *Attorney, Agent, or Firm* — Dentons US LLP

(57) ABSTRACT

A method and device for dynamically allocating resources to a frequency band of a short transmission time interval (TTI) in a wireless communication system is provided. Specifically, a plurality of first downlink channels and a second downlink channel included in a subframe corresponding to one TTI are received, wherein the plurality of first downlink channels are received during sTTIs and the second downlink channel is received during the TTI. The plurality of first downlink channels are sequentially received. The plurality of first downlink channels are demodulated using control
(Continued)

information included in a downlink control information (DCI) used for the second downlink channel and an RRC message. The control information and RRC message indicate frequency resources for the plurality of first downlink channels.

9 Claims, 20 Drawing Sheets

(51) Int. Cl.
| | | |
|---|---|---|
| *H04B 7/26* | (2006.01) | |
| *H04W 72/04* | (2009.01) | |
| *H04L 5/00* | (2006.01) | |
| *H04J 1/04* | (2006.01) | |
| *H04W 72/02* | (2009.01) | |
| *H04J 11/00* | (2006.01) | |

(52) U.S. Cl.
CPC .......... *H04L 5/0044* (2013.01); *H04L 5/0053* (2013.01); *H04W 72/02* (2013.01); *H04W 72/04* (2013.01); *H04W 72/1268* (2013.01); *H04W 72/1273* (2013.01); *H04W 72/14* (2013.01); *H04J 2011/0009* (2013.01); *H04L 5/005* (2013.01)

(56) References Cited

U.S. PATENT DOCUMENTS

| | | | | |
|---|---|---|---|---|
| 2009/0109937 A1* | 4/2009 | Cave | .................. | H04W 74/004 370/336 |
| 2009/0175245 A1* | 7/2009 | Harada | ................. | H04L 1/0007 370/336 |
| 2009/0259909 A1 | 10/2009 | Luo | | |
| 2013/0223402 A1 | 8/2013 | Feng et al. | | |
| 2014/0071954 A1 | 3/2014 | Au et al. | | |
| 2014/0226607 A1* | 8/2014 | Holma | ................. | H04L 1/1812 370/329 |
| 2014/0307667 A1* | 10/2014 | Wager | ................. | H04W 74/006 370/329 |
| 2015/0288500 A1* | 10/2015 | Montojo | ............... | H04L 5/0053 370/330 |
| 2016/0119948 A1* | 4/2016 | Damnjanovic | ....... | H04L 1/1812 370/280 |
| 2016/0128028 A1* | 5/2016 | Mallik | ................ | H04W 72/042 370/336 |
| 2016/0143030 A1* | 5/2016 | Lee | ........................... | H04L 5/00 370/329 |
| 2016/0270059 A1* | 9/2016 | Chen | ..................... | H04L 5/0051 |
| 2017/0041103 A1* | 2/2017 | Maattanen | ............ | H04L 1/1671 |
| 2017/0142712 A1* | 5/2017 | Lee | ................... | H04W 72/0446 |
| 2017/0251465 A1* | 8/2017 | Andersson | ........... | H04L 5/0037 |
| 2017/0251466 A1* | 8/2017 | Astely | .................... | H04L 5/0037 |
| 2017/0290008 A1* | 10/2017 | Tooher | ................. | H04L 1/0007 |
| 2017/0303250 A1* | 10/2017 | Shao | ........................ | H04L 51/00 |
| 2018/0006769 A1* | 1/2018 | Maattanen | ............ | H04L 1/1671 |
| 2018/0110062 A1* | 4/2018 | Byun | ...................... | H04B 7/26 |

FOREIGN PATENT DOCUMENTS

| | | |
|---|---|---|
| CN | 102273098 A | 12/2011 |
| CN | 103069914 A | 4/2013 |
| CN | 104025496 A | 9/2014 |
| CN | 104054291 A | 9/2014 |
| CN | 104254995 A | 12/2014 |
| CN | 104468030 A | 3/2015 |
| CN | 105934917 B | 5/2019 |
| EP | 3270526 A1 | 1/2018 |
| JP | 4698498 | 6/2011 |
| WO | 2008030798 | 3/2008 |
| WO | 16064049 A1 | 4/2016 |

OTHER PUBLICATIONS

LG Electronics Inc., "Discussion on Signaling for Fast Reconfiguration," R2-073506, 3GPP TSG-RAN WG2 #59, Athens, Greece, Aug. 16, 2007, see pp. 1-5.

A. Awoseyila and B. Evans, "Improved Time Diversity for LTE Over Satellite Using Split Multicode Transmission", Centre for Communication Systems Research (CCSR), University of Surrey (Electronics Letters).

* cited by examiner

METHOD FOR DYNAMICALLY ALLOCATING RESOURCES TO FREQUENCY BAND OF SHORT TTI AND DEVICE USING SAME

CROSS-REFERENCE TO RELATED APPLICATIONS

This application is the National Stage filing under 35 U.S.C. 371 of International Application No. PCT/KR2015/010854, filed on Oct. 14, 2015, which claims the benefit of U.S. Provisional Application No. 62/135,717 filed on Mar. 20, 2015, the contents of which are all hereby incorporated by reference herein in their entirety.

BACKGROUND OF THE INVENTION

Field of the Invention

The present invention relates to wireless communications, and, more particularly, a method for dynamically allocating frequency resources to short transmission time intervals (sTTIs) in a wireless communication system and a device using the method.

Related Art

A wireless communication system is widely deployed to provide various types of communication services, such as voice and data. An object of a wireless communication system is to enable a plurality of terminals to perform reliable communication regardless of their locations and mobility.

In general, a wireless communication system is a multiple access system capable of supporting communication with a plurality of terminals by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A base station (BS) properly allocates radio resources to each piece of user equipment (UE) within a cell through scheduling. The UE may transmit control information or user data to the BS using the allocated radio resources. In this case, a method for transmitting control information and a method for transmitting user data may be different. Furthermore, a method for allocating radio resources for control information and a method for allocating radio resources for user data may be different. Accordingly, radio resources for control information and radio resources for user data may be different. A BS may differently manage radio resources reserved for control information and radio resources reserved for user data.

In a 3GPP LTE system, the time taken for control information or data user to be transmitted on a single subframe is a transmission time interval (TTI). In general, the length of a single subframe is 1 ms. However, a next-generation wireless communication system for responding to a change of a higher data rate and a faster channel environment attempts to achieve latency of 1 ms on a user plane. That is, a TTI having a length of 1 ms has a structure not suitable for low latency requirements in a next-generation wireless communication system. Accordingly, there is a need for a method for disposing a radio resource structure for satisfying lower latency by controlling a short TTI subdivided from the existing TTI.

SUMMARY OF THE INVENTION

Embodiments provide a method of dynamically allocating frequency resources to short TTIs (sTTIs) and a device using the method. Furthermore, embodiments provides a channel design method for maintaining the number of resource elements in a control region (short control region) constant between sTTIs, and a device using the channel design method.

Embodiments provides a method for performing communication using a plurality of control channels and a plurality of data channels in a wireless communication system, wherein the control channels and data channels are delivered using a plurality of symbols.

First, terminologies will be defined. A sTTI corresponds to a time interval shorter than a time interval of the conventional TTI and contained within the conventional TTI. Each first downlink channel includes a sPDSCH that is received during a sTTI (short TTI) and a sPDCCH that is used to schedule the sPDSCH. A second downlink channel includes a PDSCH received during the conventional TTI, and a common PDCCH of the conventional TTI used to schedule the PDSCH. Demodulating a channel corresponds to decoding a channel.

In this method, a plurality of the first downlink channels included in a subframe corresponding to one conventional TTI and received during the sTTI are received, and the second downlink channel received during the conventional TTI is received. The plurality of the first downlink channels are received sequentially. That is, in the first sTTI, second sTTI, and third sTTI in this order, the first downlink channels are received.

In this method, the first downlink channels are demodulated using a RRC message, and control information contained within downlink control information (DCI) used for the second downlink channel. The downlink control information (DCI) indicates DCI of the common PDCCH, and, thus, the control information contained within the downlink control information (DCI) corresponds to transmission information of the common PDCCH. Further, the control information contained within the downlink control information (DCI) and the RRC message indicate the frequency resources for the first downlink channels. That is, the common PDCCH and the RRC message indicate information on a frequency band during a corresponding sTTI. Furthermore, the plurality of the first downlink channel and the second downlink channel are allocated to different frequency bands, that is, different subbands.

As a result, in order to demodulate the plurality of the first downlink channels received during the sTTI, using the common PDCCH by way of the DCI format and scheduling by way of the RRC may be utilized as appropriate.

A first symbol of each of the first downlink channels includes a short Physical Control Format Indicator Channel (sPCFICH), wherein each sPCFICH indicates a resources region used for transmitting a control region for each of the first plurality of downlink channels. That is, each sPCFICH indicates a frequency region allocated to a control region (sCR) of each sTTI. At least one symbol among symbols used for transmitting each of the first downlink channels includes a cell-specific reference signal (CRS). That is, at least one symbol in each sTTI should include the CRS.

The Downlink Control Information (DCI) indicates frequency resources used for the first downlink channels. The Downlink Control Information (DCI) indicates frequency resources for the sTTIs. The DCI indicates whether the frequency resource used for the first downlink channels in a current subframe are allocated in a subsequent subframe. The RRC message indicates frequency resources used for the first downlink channels.

Further, the RRC message indicates an uplink resource region that is accessed in a contention-based manner. The RRC message indicates information on time resources used for transmitting the short TTIs (sTTIs). That is, the RRC message indicates time/frequency region regions for the uplink. The downlink control information (DCI) indicates an uplink resource region that is accessed in a contention-based manner. That is, the DCI format of the common PDCCH includes information on uplink contention-based resource allocation.

Each of the first downlink channels is received using the same number of symbols. This means that the number of symbols for each sTTIs in the time domain is the same between the sTTIs. The plurality of symbols includes Orthogonal Frequency Division Multiplexing (OFDM) symbols or Single-Carrier Frequency Division Multiple Access (SC-FDMA) symbols.

There is further provided a receiving device for performing communication using a plurality of control channels and a plurality of data channels in a wireless communication system, wherein the control channels and data channels are delivered using a plurality of symbols.

First, terminologies will be defined. A sTTI corresponds to a time interval shorter than a time interval of the conventional TTI and contained within the conventional TTI. Each first downlink channel includes a sPDSCH that is received during a sTTI (short TTI) and a sPDCCH that is used to schedule the sPDSCH. A second downlink channel includes a PDSCH received during the conventional TTI, and a common PDCCH of the conventional TTI used to schedule the PDSCH. Demodulating a channel corresponds to decoding a channel.

The device includes a radio frequency (RF) unit configured to transmit and receive a radio signal; and a processor coupled to the RF unit, wherein the processor is configured: to receive a plurality of first downlink channels and a second downlink channel, wherein the plurality of first downlink channels are included in a subframe corresponding to one transmission time interval (TTI) and are received during respective short TTIs (sTTIs), wherein the second downlink channel is received during the TTI, wherein the plurality of first downlink channels are received sequentially. That is, in the first sTTI, second sTTI, and third sTTI in this order, the first downlink channels are received.

The processor is further configured to demodulate the first downlink channels using a RRC message, and control information contained within downlink control information (DCI) used for the second downlink channel. The downlink control information (DCI) indicates DCI of the common PDCCH, and, thus, the control information contained within the downlink control information (DCI) corresponds to transmission information of the common PDCCH. Further, the control information contained within the downlink control information (DCI) and the RRC message indicate the frequency resources for the first downlink channels. That is, the common PDCCH and the RRC message indicate information on a frequency band during a corresponding sTTI. Furthermore, the plurality of the first downlink channel and the second downlink channel are allocated to different frequency bands, that is, different subbands.

As a result, in order to demodulate the plurality of the first downlink channels received during the sTTI, using the common PDCCH by way of the DCI format and scheduling by way of the RRC may be utilized as appropriate.

In order to dynamically allocate the frequency resources for the sTTIs, using the common PDCCH by way of the DCI format and scheduling by way of the RRC may be utilized as appropriate. In this way, the transmission rate of the terminal device can be increased. Furthermore, the complexity of control information generation can be reduced by keeping the number of resource elements in the control region of the sTTI uniform between the sTTIs.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE. However, technical features of the present invention are not limited thereto.

Figure 1:
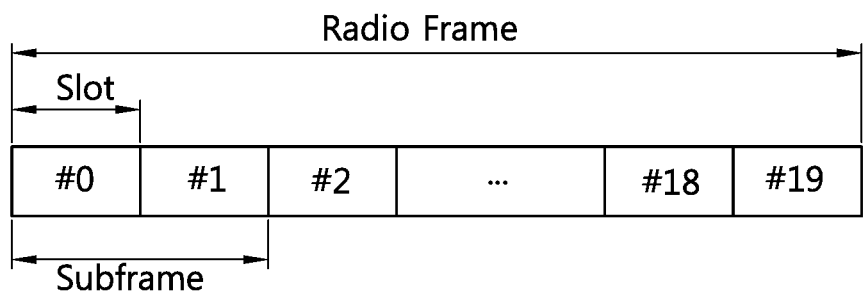
FIG. 1 shows a structure of a radio frame in 3GPP LTE.

FIG. 1 shows a structure of a radio frame in 3GPP LTE.

Referring to FIG. 1, the radio frame consists of 10 subframes. One subframe consists of 2 slots. The slots in the radio frame are numbered from slot number 0 to 19. A time required for transmitting one subframe is defined as a transmission time interval (TTI). The TTI is a unit of scheduling for transmitting a data. For example, one subframe may have a length of 1 millisecond (ms), and one slot may have a length of 0.5 ms.

The structure of the radio frame is for exemplary purposes only, and the number of subframes included in the radio frame or the number of slots included in the subframe and the number of SC-FDMA symbols included in the slot can change variously.

Figure 2:
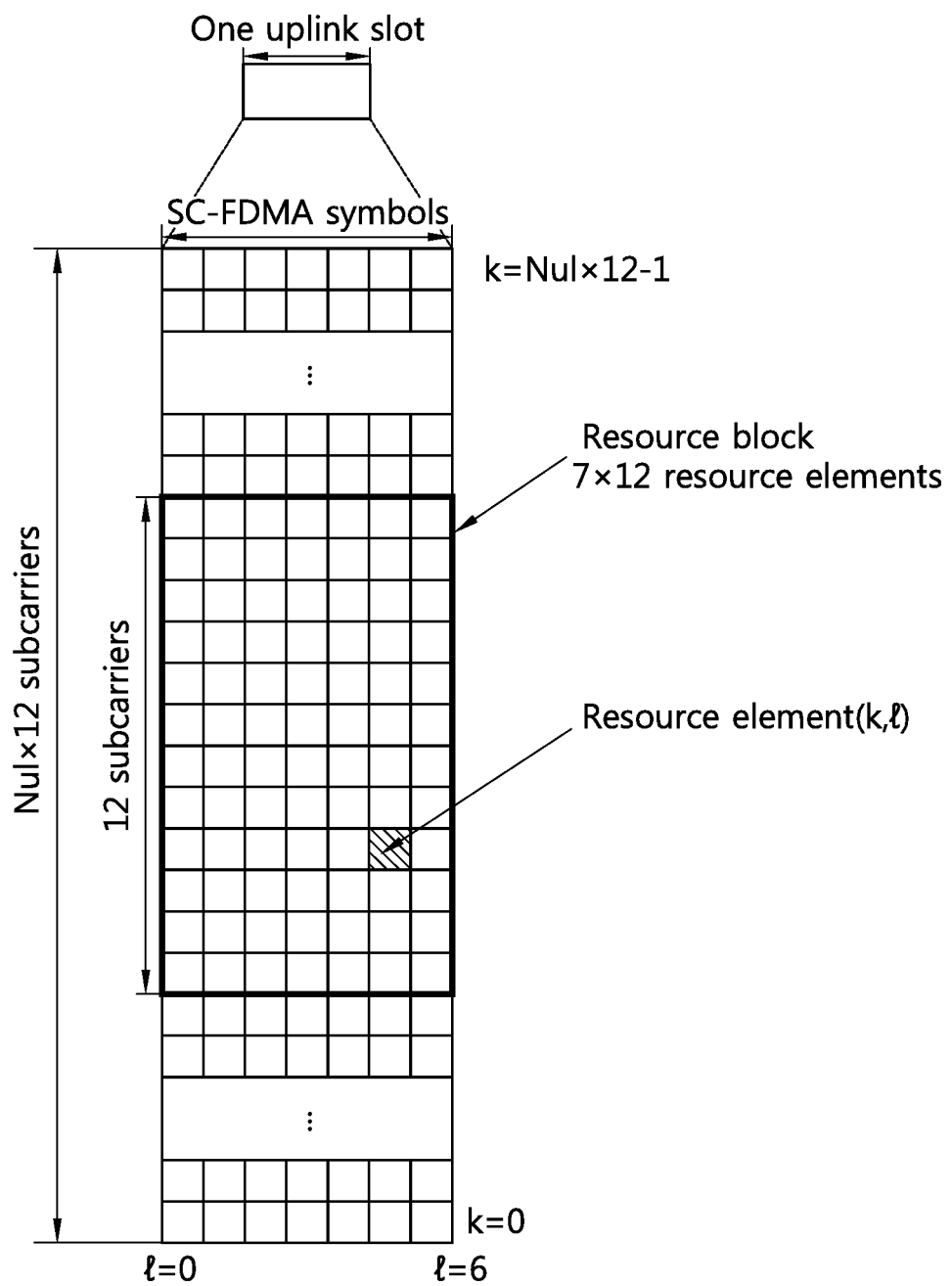
FIG. 2 is a diagram showing an example of a resource grid for one uplink slot in 3GPP LTE.

FIG. 2 is a diagram showing an example of a resource grid for one uplink slot in 3GPP LTE.

Referring to FIG. 2, The UL slot includes a plurality of SC-FDMA symbols in a time domain and includes a plurality of $N^{UL}$ RBs in a frequency domain. It is described that the SC-FDMA symbols are for representing one symbol period, and the SC-FDMA symbols can be OFDM symbols or symbol period according to the system. The RBs are a unit of resource allocation in the frequency domain and include 12 subcarriers. The number $N^{UL}$ of RBs included in the UL slot depends on a UL bandwidth defined in a cell. The UL bandwidth is system information. The UE may know $N^{UL}$ by acquiring the system information.

Each element on the resource grid is referred to as a resource element. One RB includes 12×7 resource elements. The resource element on the resource grid can be identified by an index pair (k, l) within the slot. Herein, k(k=0, . . . , $N^{UL}$×12−1) denotes a subcarrier index in the frequency domain, and l(l=0, . . . , 6) denotes an SC-FDMA symbol index in the time domain.

Although it is described herein that one RB includes 7×12 resource elements consisting of 7 SC-FDMA symbols in the time domain and 12 subcarriers in the frequency domain for example, the number of SC-FDMA symbols and the number of subcarriers in the RB are not limited thereto. Thus, the number of subcarriers or the number of SC-FDMA symbols included in the RB may change variously. The number of SC-FDMA symbols may change depending on a cyclic prefix (CP) length. For example, when using a normal CP, the number of SC-FDMA symbols included in one slot is 7, and when using an extended CP, the number of SC-FDMA symbols included in one slot is 6.

In 3GPP LTE of FIG. 2, a resource grid for a single uplink slot may also be applied to a resource grid for a downlink slot. In this case, the downlink slot includes a plurality of orthogonal frequency division multiplexing (OFDM) symbols in a time domain.

Figure 3:
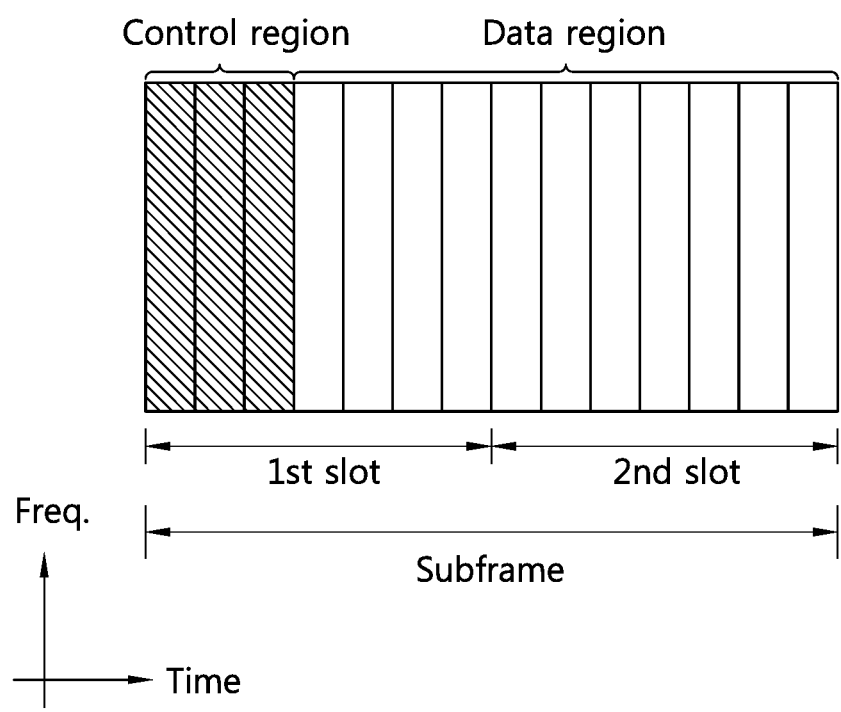
FIG. 3 shows an example of a structure of a downlink subframe in 3GPP LTE.

FIG. 3 shows an example of a structure of a downlink subframe in 3GPP LTE.

Referring to FIG. 3, a downlink subframe includes two contiguous slots. In the first slot of the downlink subframe, a maximum of the former three OFDM symbols become a control region to which a physical downlink control channel (PDCCH) is allocated, and the remaining OFDM symbols become a data region to which physical downlink shared channels (PDSCHs) are allocated. Control channels, such as a physical control format indicator channel (PCFICH) and a physical hybrid-ARQ indicator channel (PHICH), in addition to a PDCCH may be allocated to the control region. In this case, the inclusion of the three OFDM symbols in the control region is only an example. The number of OFDM symbols included in the control region of a subframe may be aware through a PCFICH. A PHICH carries hybrid automatic repeat request (HARQ) acknowledgement (ACK)/not-acknowledgement (NACK) information as a response to uplink data transmission.

A PDCCH may carry a downlink grant that provides notification of the resource allocation of downlink transmission on a PDSCH. UE may read downlink user data transmitted through a PDSCH by decoding control information transmitted through the PDCCH. Furthermore, the PDCCH may carry control information, used for physical uplink shared channel (PUSCH) scheduling, to the UE. The control information used for PUSCH scheduling is an uplink grant that provides notification of the resource allocation of uplink transmission.

A control region consists of an aggregation of a plurality of control channel elements (CCEs). A PDCCH is transmitted on an aggregation of one or some contiguous CCEs. A CCE corresponds to a plurality of resource element groups. A resource element group is used to define the mapping of a control channel to a resource element. In a downlink subframe, if a total number of CCEs is $N_{cce}$, CCE indices of 0 to $N_{cce}$,k−1 are assigned to CCEs. A total number of CCEs within a subframe may also be different in each subframe because the number of OFDM symbols included in a control region within a subframe may be different in each subframe.

Figure 4:
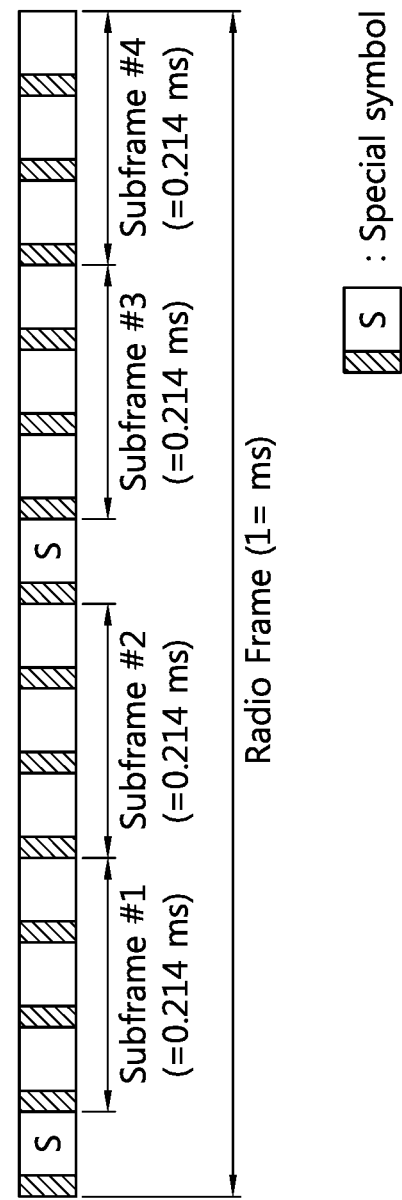
FIG. 4 shows the structure of a radio frame including subframes and special symbols.

FIG. 4 shows the structure of a radio frame including subframes and special symbols.

FIG. 4 illustrates a time section transmission resource structure in which three OFDM symbols (N=3) form a single subframe and four subframes (M=4) and two special symbols (P=2) define a radio frame of 1 ms in length. The length of each subframe is 0.214 ms.

In this case, special symbols within the radio frame may be disposed at equal distances, may be disposed only at a specific location, or may be irregularly disposed. If the role of special symbols is for measurement, detection or the transfer of information, the special symbols may be disposed at equal distances. Special symbols may be irregularly disposed depending on the number of pieces of UE within a cell or a channel characteristic. Some examples in which a special symbol is disposed are described below.

Figure 5:
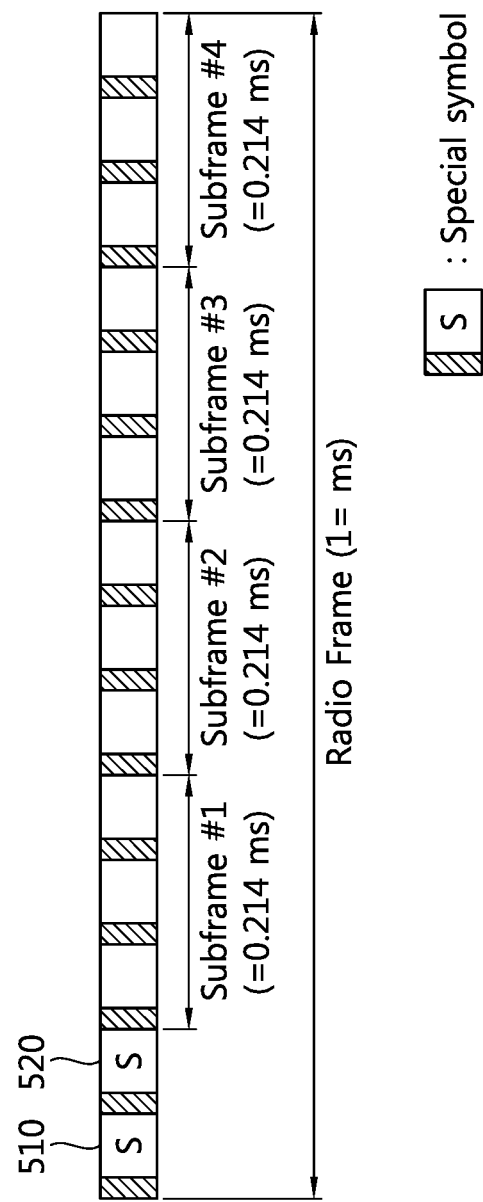
FIG. 5 shows an example of the structure of a radio frame in which special symbols have been contiguously disposed at the front part of the radio frame.
Figure 6:
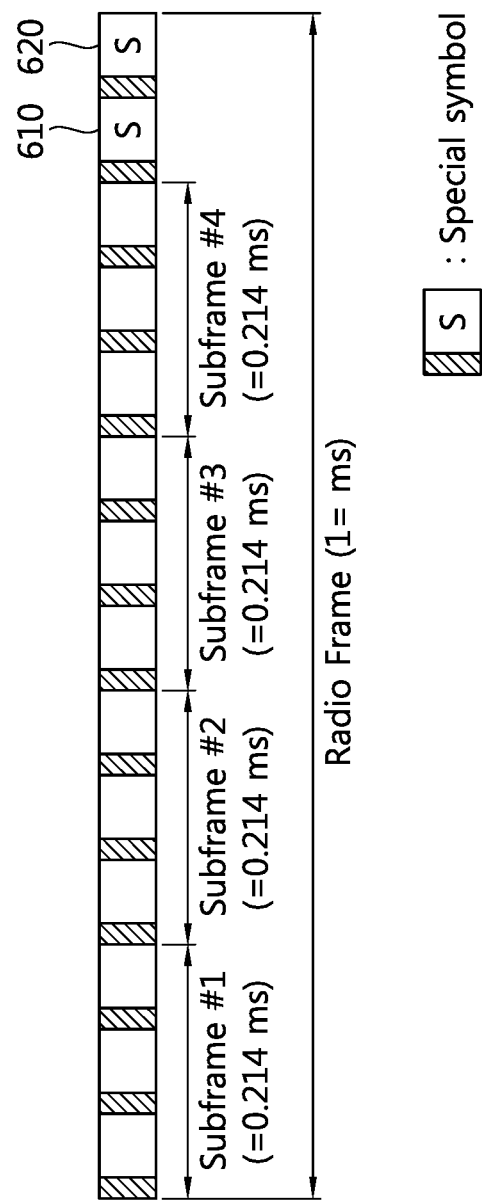
FIG. 6 shows an example of the structure of a radio frame in which special symbols have been contiguously disposed at the back part of the radio frame.

FIG. 5 shows an example of the structure of a radio frame in which special symbols have been contiguously disposed at the front part of the radio frame. FIG. 6 shows an example of the structure of a radio frame in which special symbols have been contiguously disposed at the back part of the radio frame. FIG. 5 shows a transmission resource structure in which special symbols 510 and 520 are contiguously disposed in symbols that are temporally the first two on the radio frame. FIG. 6 shows a transmission resource structure in which special symbols are contiguously disposed in symbols 610 and 620 that are temporally the last two on the radio frame.

In this specification, in the time section transmission resource structure, the locations of special symbols in each radio frame may be different in a radio frame unit or a plurality of radio frame units. If one or a plurality of special symbol is periodically disposed in a radio frame unit, the locations of special symbol in a corresponding cycle may be patterned, and an index may be assigned to the pattern. Alternatively, a BS may notify UE of control information about a bitmap form in a radio frame unit through RRC signaling, may transfer the control information to the UE through a downlink physical data channel using an MAC control element (CE), or may transfer the control information to the UE through a downlink physical control channel.

In this specification, the time section transmission resource structure is specified in a UE unit in frequency division duplex (FDD). Alternatively, the time section transmission resource structure may be applied to both a downlink transmission band and an uplink transmission band or only one of a downlink transmission band and an uplink transmission band with respect to all of pieces of UE within a cell.

Likewise, the time section transmission resource structure may be specified in a UE unit in time division duplex (TDD) or full duplex using specific radio resources for uplink/downlink transmission. Alternatively, the time section transmission resource structure may be applied to both downlink transmission time resources and uplink transmission time resources or only one of downlink transmission time resources and uplink transmission time resources with respect to all of pieces of UE within a cell. From a viewpoint of an uplink/downlink time section resource configuration of TDD, a method for designating downlink transmission resources and uplink transmission resources in a radio frame unit may be applied to the time section transmission resource structure. Alternatively, a method for designating downlink transmission resources and uplink transmission resources in a subframe unit within a radio frame may be applied to the time section transmission resource structure.

That is, in this specification, the time section transmission resource structure is provided on the basis that it may be independently applied to uplink/downlink transmission resources using parameters independently on a physical control channel or RRC signaling. Furthermore, if only a method for simultaneously applying uplink transmission and downlink transmission is used depending on a method for applying a system, the time section transmission resource structure may be applied in common simultaneously using a single parameter on a physical control channel or RRC signaling.

In this specification, the time section transmission resource structure defines a special symbol within a radio frame independently of a subframe. In this case, the special symbol may be used to transmit special cell-common or UE-specific control information. Furthermore, the special symbol may be used to transmit a special cell-common or UE-specific physical signal (e.g., a pilot, a reference signal or a synchronization signal) for the purpose of the measurement or detection of UE. Possible examples of a signal or control information that is transmitted in the special symbol are described below in the case of downlink and uplink.

1. Downlink (1) Transmission of Physical Downlink Control Channel (PDCCH)

A BS transmits a PDCCH, including UE-common control information or pieces of UE-specific control information required to be transmitted from the BS or a specific network radio node to UE through downlink, to the UE through a special symbol. The UE may receive a physical channel, that is, the object of the special symbol. In this case, the PDCCH is basically designed on a frequency resource on a single special symbol, but may be designed on a plurality of symbols resources and frequency resources if a plurality of special symbols is used.

(2) Transmission of Downlink Synchronization Signal

A BS may transmit a downlink synchronization physical signal transmitted so as to obtain the downlink reception synchronization of UE through one or more special symbols. For example, in 3GPP LTE, a primary synchronization signal (PSS) and a secondary synchronization signal (SSS) become the object of a downlink synchronization physical signal. If such a method is applied, the location of a special symbol used to the corresponding object within a specific defined radio frame on time section resources may be designated in a UE-common manner. Furthermore, a BS and UE permanently designate the location of a special symbol without separate signaling.

(3) Transmission of Downlink Channel Measurement Pilot (or Reference Signal)

For the purpose of system downlink control including the support of a determination of the time-frequency resource configuration and transmission method of a packet scheduler adaptive to a radio channel on a radio packet transmission system, a downlink channel measurement pilot is transmitted through one or more special symbols defined separately from a UE data channel transmission time section. Furthermore, UE performs radio channel measurement using a corresponding pilot through a corresponding special symbol. This method may be used as a method for preventing the deterioration of data transmission performance generated because resources for transmitting the existing data channel are excessively used to transmit a pilot signal if a technology in which downlink transmission is performed using a large number of transmission antennas, such as massive MIMO, is used in a mobile communication system. In this case, the massive MIMO may be defined as a transmission method using 16 or more transmission antennas. It is assumed that a downlink channel measurement pilot is transmitted using a plurality of special symbols. In this case, in addition to the multiplexing method of a multiple pilot resource pattern using a basic TDM, FDM method, the multiplexing method of a multiple pilot resource pattern using a CDM method through the application of time section orthogonal code or frequency section orthogonal code may be applied.

(4) Use of Interference Signal Measurement by UE

An operation of allowing UE to measure a downlink reception interference signal of another network radio node or UE other than a network radio node (or BS) that provides service through one or more special symbols may be defined. As a first example, a specific network radio node (or BS) excludes the transmission of a radio signal in all of subcarrier resources or some designated subcarrier resources included in a special symbol on time section transmission resources that are to be used for transmission by the specific network radio node (or BS). Furthermore, UE that is provided with service from a corresponding network radio node may use a method for receiving a specific signal (it may be defined as a pilot or reference signal) of adjacent network radio nodes (or BSs) through the corresponding symbol. In this case, a special symbol transmission signal on a plurality of network radio nodes may be defined as a pilot (or reference signal) for downlink channel measurement. Furthermore, in order to exclude the transmission of a radio signal, all of subcarrier resources within a specific pilot pattern or a corresponding symbol may be specially defined as a null power pilot. As a second example, an operation for the UE interference measurement of the first example may be applied in a situation in which a serving network radio node also transmits a signal by applying a specific resources pattern of a specific pilot (or reference signal) of a specific channel may also be applied.

(5) Transmission of Downlink ACK/NACK Signal for Uplink Data

A downlink ACK/NACK signal for transmitting uplink data is defined as a physical channel on a specific special symbol. A network radio node (or a BS) that receives the uplink data transmits the downlink ACK/NACK signal through the corresponding special symbol. A correction mechanism operation for detecting an error of a system physical layer may be defined so that UE that transmits the uplink data receives the downlink ACK/NACK signal through the corresponding special symbol.

(6) Transmission of Downlink Massive MIMO Beam Scanning Signal

In this specification, a radio network node (or a BS) adopting a time section transmission resource structure also applies a downlink transmission method of massive MIMO. In this case, an operation for transmitting, by a network radio node (or a BS), the transmission of a signature, pilot or reference signal for supporting the UE beam tracking of massive MIMO in a specific cycle through a special symbol and receiving, by UE, the signature, pilot or reference signal through a corresponding special symbol may be defined as applied.

2. Uplink (1) Transmission of an Uplink Synchronization Signal

A method for designing the uplink synchronization signal (e.g., a physical random access channel (PRACH) preamble in 3GPP LTE) of UE in the length of one or a plurality of special symbols and transmitting the uplink synchronization signal may be applied in a situation in which this time section transmission resource structure is applied as an uplink transmission frame structure.

(2) Transmission of Uplink Channel Sounding Signal

An uplink channel sounding signal of UE may be designated to be transmitted through a special symbol on the time section transmission resource structure. If a network radio node (or a BS) instructs the uplink channel sounding signal to be transmitted, a UE-specific uplink data transmission grant at a specific point of time prior to a corresponding special symbol by a designated length (it may be designated in a radio frame or subframe unit) may be triggered in a PDCCH using in a channel sounding transmission indicator. In some embodiments, a UE-specific uplink data transmission grant may be designated using an RRC parameter and signaled to UE when a periodical channel sounding signal is transmitted. In both the methods, a point of time at which the transmission of a UE-specific channel sounding signal is attempted and a resource configuration may be previously designated using an RRC parameter and signaled to UE.

(3) Transmission of Physical Uplink Control Channel (PUCCH)

In a situation in which the time section transmission resource structure is applied as an uplink transmission frame structure, a method for transmitting uplink control information of specific UE through a PUCCH designed on one or a plurality of special symbols may be applied. In this case, the uplink control information of UE may be defined as follows.

Uplink scheduling request information according to a change of the transmission buffer state of UE (data arrival)

Downlink channel measurement information of UE

ACK/NACK information for the reception of downlink data by UE

The type of uplink physical control channel transmitted through one or a plurality of special symbols may be designated by taking into consideration the requirement information about of the above-described uplink control information, that is, a bit size. The type basically includes the following two schemes.

Scheme #1: A method for defining one PUCCH supporting an error generation restriction condition that is required for each piece of information on a bit size of uplink control information of a wide range and being applied to control information cases in common.

Scheme #2: A method for defining an individual PUCCH(s) supporting a maximum size of control information bit and an error requirement condition of corresponding information for each piece of control information in the case where a difference between the bit size of individual uplink control information and a required error generation rate restriction condition is defined to be large and transmitting the individual PUCCH(s) through one or a plurality of special symbols.

(4) Utilization of Interference Signal Measurement by UE

An operation for allowing a network radio node (or a BS) to measure the uplink reception interference signal of another network radio node or UE through one or more special symbols may be defined. As a detailed example, a plurality of pieces of specific UE or a specific network radio node (or a BS) may be designated to transmit a special pilot (or reference signal or signature), that is, an object of interference measurement, using a special symbol. In this case, the specific radio network node (or the BS) may check a surrounding interference situation by receiving and detecting such signals. In this case, the transmission of a corresponding pilot through special symbols of pieces of UEs that are to be received by the specific network radio node (or the BS) through uplink may be excluded. Furthermore, for such a purpose, all of subcarrier resources within a specific pilot pattern or a corresponding symbol may be specially defined as a null power pilot.

However, when applying a sTTI, a special symbol exists in each sTTI, thereby reducing a resource region that can be used for transmitting data per each TTI. Further, if a subband corresponding to the sTTI is allocated with an excessively small size, a data region becomes small, so that the data cannot be transmitted in the corresponding sTTI, and, then, the data transmission may be transferred to a next sTTI. Conversely, if the subband corresponding to the sTTI is allocated to have a size that is too large, performance of a conventional terminal device is significantly degraded. In order to solve such problems, a method of dynamically allocating resources to the frequency band of the sTTI is proposed below.

Figure 7:
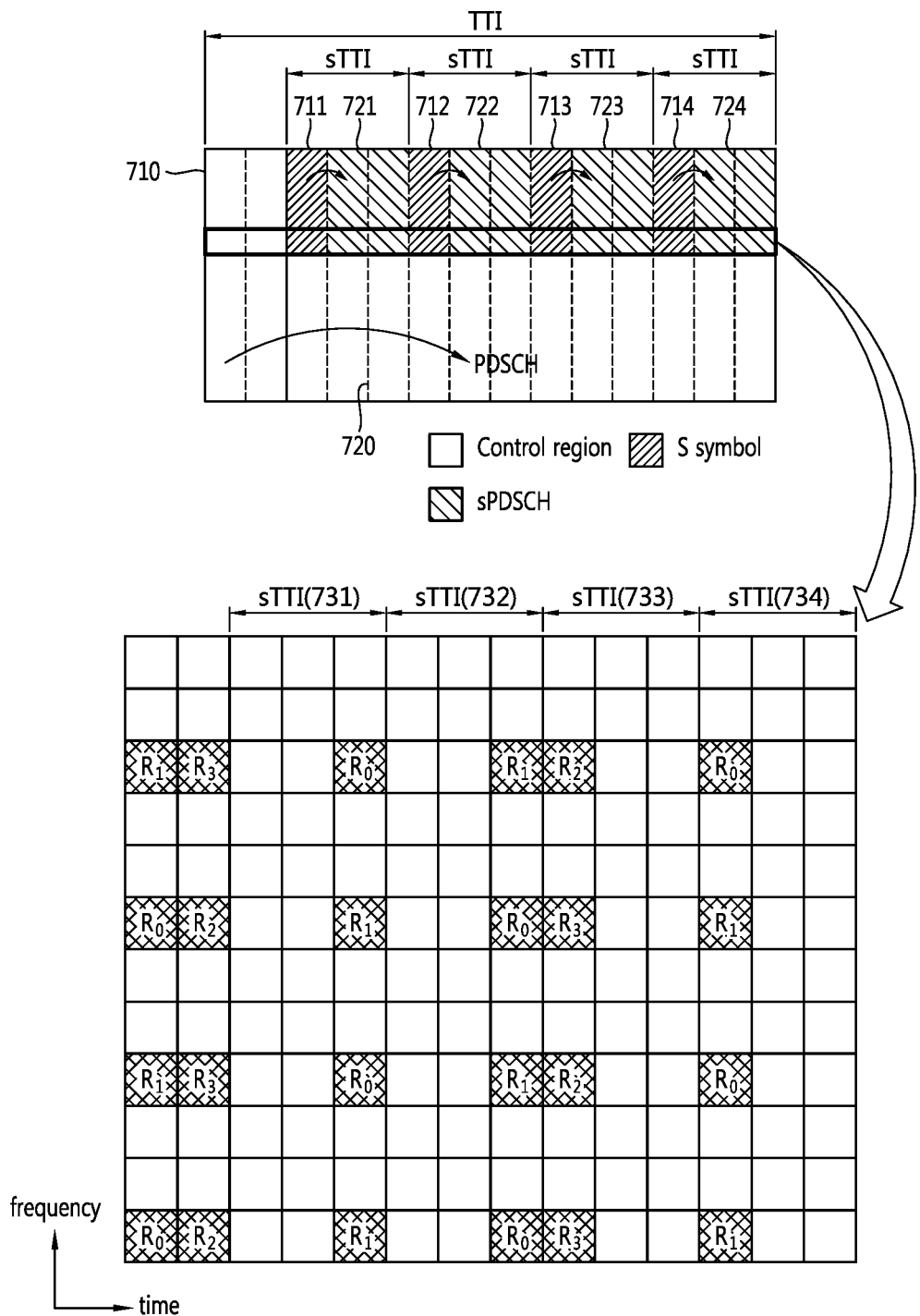
FIG. 7 shows an example of arranging reference signals in a single resource block.

FIG. 7 shows an example of arranging reference signals in a single resource block.

In FIG. 7, there is enlarged one specific resource block in an entire frequency band including a plurality of resource blocks (RBs) in which sTTIs are arranged. FIG. 7 shows an arrangement of reference signals in the specific resource block. Therefore, when one subframe is referred to, one specific resource block includes 14 OFDM symbols in a time domain and 12 subcarriers in a frequency domain. The arrangement of sTTIs may largely depending on whether a first sTTI has a special symbol. FIG. 7 shows that an arbitrary sTTI arrangement is made when the first sTTI has a special symbol. However, the present invention is not limited thereto. Different arrangements of the sTTIs are possible when the first sTTI does not have a separate special symbol (that is, when the first sTTI shares a control region of the conventional TTI) or even when the first sTTI has a separate special symbol.

First, terminologies will be defined. A sTTI corresponds to a time interval shorter than a time interval of the conventional TTI and contained within the conventional TTI. Each first downlink channel includes a sPDSCH 721, 722, 723 and 724 that is received during a sTTI (short TTI) and a sPDCCH 711, 712, 713 and 714 that is used to schedule the sPDSCH. A second downlink channel includes a PDSCH 720 received during the conventional TTI, and a common PDCCH 710 of the conventional TTI used to schedule the PDSCH. Demodulating a channel corresponds to decoding a channel.

Referring to FIG. 7, in a conventional TTI, the number of resource elements (REs) available for data transmission within a single resource block is 128. 128 is calculated by subtracting the number of resource elements corresponding to the control region and reference signals from a total number of resource elements in the single resource block. On the other hand, in each of first and second sTTIs 731 and 732, the number of available resource elements for data transmission is 20. In each of third and fourth sTTIs 733 and 734, the number of available resource elements for data transmission is 24. These numbers are calculated by subtracting the total number of resource elements in the corresponding sTTIs minus the number of resource elements corresponding to the special symbol and the reference signals. As a result, it may be seen that when the sTTI is applied, the amount of available resource elements for data transmission is reduced by a maximum of 0.1875 times, as compared to the application of the conventional TTI.

Thus, the reduction of the data channel due to the application of sTTI has a more serious effect on the terminal device in the cell boundary area, wherein the number of bits that can be transmitted per a single resource block is reduced in the cell boundary area. This is because MCS (Modulation Coding Scheme) is not applied to the cell boundary zone, and thus the modulation order cannot be raised for such a zone. For example, when a center frequency is 2 GHz, a bandwidth is 10 MHz (50 resource blocks), there are 10 terminal devices per a sector, and a full buffer model is applied where a base station (eNodeB) has data to be sent to all of the 10 terminal devices, frequency efficiency of lower 5% of the terminal devices is about 0.25 b/s/Hz. This full buffer model corresponds to a situation where data to be received by all the terminal devices exists in each TTI. When all terminal devices are uniformly allocated the frequency resources, bits that can be received for one second by a terminal device in the cell boundary zone is 5(resource block)*12(subcarrier)*15 (kHz)*0.25 (b/s/Hz)=225000 (b/s). Therefore, the number of bits that can be received by the terminal device for 1 ms corresponding to a single TTI is 225 bits. When 225 bits are multiplied by 0.1875, bits that can be received by the lower 5% of the terminal devices in a single sTTI becomes 40.5 bits.

Furthermore, when a FTP (File Transfer Protocol) model is applied where not all terminal devices always receive data, but data for each terminal device is generated using a probability model (exponential random variable), and if a packet size is 500 kbytes and a packet arrival rate is 2.5 packet/s/cell, the lower 5% of the terminal devices may have a data rate of 3.77 Mbps. In this case, the number of bits transmitted in a single TTI is 3770 bits. When 3770 is multiplied by 0.1875, bits that can be received by the lower 5% p of the UEs in a single sTTI becomes 678.6 bits.

In the case of the FTP model, when a packet arrives at a buffer, if there is no packet other than a packet to be transmitted to a specific terminal device by the base station, the packet may be transmitted to the specific terminal device using an entire frequency band. However, if there is another packet to be sent to another terminal device, the whole frequency band may be divided into sub-bands, and, then, the packets may be transmitted using the sub-bands to the specific terminal device and another terminal device. Therefore, in the FTP model, the frequency band for the lower 5% of the terminal devices may be dynamically allocated to achieve the transmission rate of the lower 5% of the terminal devices.

Regarding the overall operations of the method according to the invention, first, a plurality of first downlink channels included in the subframe corresponding to one conventional TTI and received during the sTTI are received, and a second downlink channel received during the conventional TTI is received. A plurality of the first downlink channels are received sequentially. That is, in a first sTTI 731, a second sTTI 732, a third sTTI 733, and a fourth sTTI 734 in this order, the first downlink channels are received.

Then, the first downlink channels are demodulated using a RRC message, and control information contained within downlink control information (DCI) used for the second downlink channel. The control information contained within the downlink control information (DCI), and the RRC message will be described in details with reference to FIG. 9 to FIG. 11. The downlink control information (DCI) indicates DCI of the common PDCCH, and, thus, the control information contained within the downlink control information (DCI) corresponds to transmission information of the common PDCCH. Further, the control information contained within the downlink control information (DCI) and the RRC message indicate the frequency resources for the first downlink channels. That is, the common PDCCH and the RRC message indicate information on a frequency band during a corresponding sTTI. Furthermore, the plurality of the first downlink channel and the second downlink channel are allocated to different frequency bands, that is, different subbands.

As a result, in order to demodulate the plurality of the first downlink channels received during the sTTI, using the common PDCCH by way of the DCI format and scheduling by way of the RRC may be utilized as appropriate.

Figure 8:
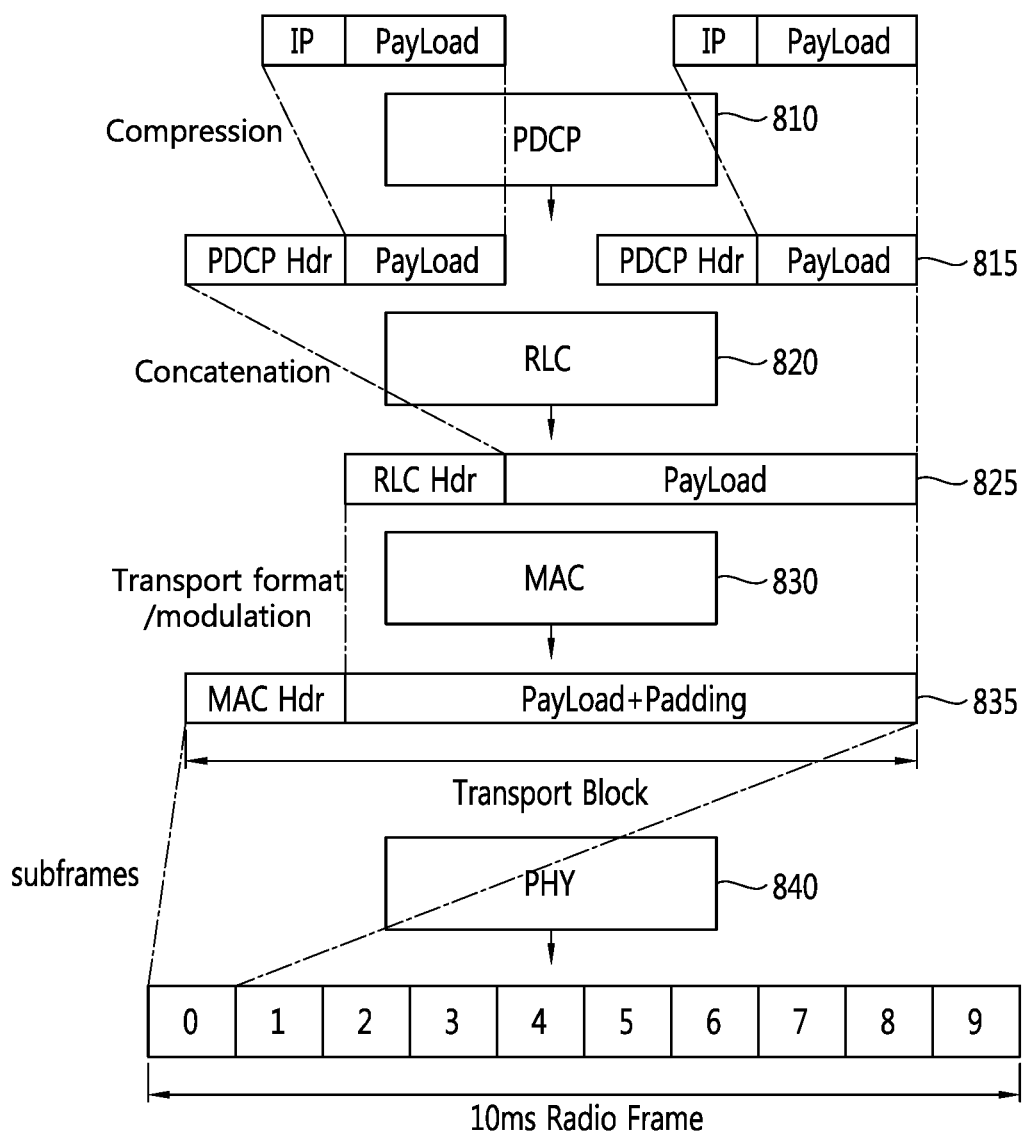
FIG. 8 shows a process of generating data to be transferred through a transport block.

FIG. 8 shows a process of generating data to be transferred through a transport block.

Referring to FIG. 8, a Packet Data Convergence Protocol (PDCP) layer 810 performs IP header compression to reduce the number of bits to be transmitted over a wireless interface, and attaches to a payload a PDCP header (PDCP Hdr) containing information necessary for deciphering. The result (payload+PDCP Hdr) 815 of the PDCP layer is transmitted to a RLC layer 820. The Radio Link Control (RLC) layer 820 concatenates PDCP SDU (Service Data Unit) with the result and attaches a RLC header (RLC Hdr) thereto. The RLC header is used for in-sequence delivery and RLC PDU checking at RLC retransmission in a UE. The RLC PDU 825 is transmitted to a MAC layer 830, where a transport block 835 is formed by adding a transport format, modulation and MAC header (MAC Hdr) to the RLC PDU. One transport block 835 is transmitted to a physical layer 840 per one TTI corresponding to a 1 ms long subframe.

As seen from FIG. 8, data to be transmitted through the physical channel may have the header attached thereto, as generated in the upper layer. Therefore, the physical channel must be at least larger than the header, in order to be able to transmit information in the application layer.

The header as generated in the upper layer changes based on a procedure in the upper layer. For example, when performing RACH (Random Access Channel) in the MAC layer of 3GPP LTE, a 10-byte header is required for RRC connection establishment. Further, 60 bits are required for further RRC connection establishment. That is, at least 140 bits should be transmitted such that the RRC connection is established. Furthermore, 4 bytes of the RLC header and 1 byte of the MAC header are required for data transmission. Thus, a total of 50 bits is required for the data transmission.

As in the above-mentioned full buffer model, the user equally divides the frequency bands into the subbands. However, this is meaningless because an actual transmission data portion is very small compared to the header size. In addition, when sTTI available resources are defined via the RRC, it is difficult to dynamically allocate the sTTI resources based on the type and amount of packets in the buffer. As a result, as for the full buffer model, it is difficult to obtain the same transmission rate as that in the FTP model. For example, if a sTTI resource region is limited to ⅓ of the total frequency resource, the transmission rate of the lower 5% of the terminal devices is reduced to about ⅓ of a transmission rate without the limitation. Thus, even when an entirety of a single sTTI is allocated to one terminal device, the number of the bits which may be received by the terminal device becomes about 229 bits (⅓ of the above-mentioned 678.6 bits). Therefore, it may be seen that there are too few resource regions available for actual data transmission. If the resources allocated to the sTTI are extended to the entire frequency band using the RRC, the transmission rate of the conventional terminal device will decrease drastically. Therefore, it is necessary to more dynamically allocate sTTI resources using the RRC.

Furthermore, it may be seen that the amount of the resource elements of the control region (sCR) corresponding to the special symbol varies between the sTTIs. For example, the number of resource elements in the control region of each of the first and the second sTTIs 731 and 732 is 12, while the number of resource elements in the control region of each of the third and fourth sTTIs 733 and 734 is 8, except for resource elements corresponding to the reference signals. When the number of resource elements in the control region varies between the sTTIs, the complexity in generating control information increases. Therefore, it is necessary to reduce the complexity in the control information generation by making the number of resource elements in the control region uniform between the sTTIs.

Therefore, embodiments propose a method of dynamically allocating frequency resources to the sTTIs, and a channel design method for keeping the number of the resource elements in the sTTI control region (sCR) uniform between the sTTIs.

<Dynamic Allocation of Frequency Resources to sTTIs>

The applicants propose a method for scheduling frequency resources for sTTIs via a RRC and a PDCCH of a conventional TTI. If scheduling the frequency resources for sTTIs only via the RRC, control information resources of the physical layer need not be changed, but frequency resources cannot be dynamically allocated and data transmission rate is lowered. When scheduling the frequency resources for sTTIs only via the PDCCH of the conventional TTI, the size of the PDCCH becomes too large. Therefore, the applicants propose the method for dynamically allocating the frequency resources to sTTIs by appropriately using both the RRC and PDCCH of the conventional TTI. In this connection, the PDCCH of the conventional TTI is commonly referred to by the terminal devices allocated to the corresponding sTTI, and, thus, is referred to as a common PDCCH. That is, the common PDCCH is included in the control region of the conventional TTI. The above-described method operates in the following order.

First, a base station (eNB) notifies, using the RRC, a terminal device with a low latency service of allocation of a frequency resource for a sTTI. That is, the terminal device allocated to the sTTI is allocated a C-RNTI (Cell-Radio Network Temporary Identifier) via the RRC so that the terminal device allocated to the sTTI blind-decodes a signal of the common PDCCH. Next, the terminal device blind-decodes the common PDCCH using the C-RNTI. By performing such blind decoding, the frequency resource region for the sTTI allocated to the corresponding subframe may be figured out by the UE.

Information commonly applied to sTTIs in the conventional TTI is transmitted using the common PDCCH. Furthermore, a frequency resource region for the sTTIs may inform only frequency resources for the downlink, may inform only frequency resources for the uplink, or may inform frequency resources for both the downlink and the uplink. Further, a common PDCCH used for selecting transmission frequency bands for the sTTIs may be used to allocate frequency resources for the sTTIs every subframe (i.e., every 1 ms). Alternatively, only a common PDCCH of a specific subframe designated by the RRC may be used to allocate frequency resources for the sTTIs. Alternatively, the common PDCCH of the specific subframe may specify frequency resource allocation for the sTTIs in the corresponding subframe using a common PDCCH of a several-th subframe following the specific subframe. That is, the common PDCCH may be decoded to obtain the above-described information.

In this specification, the common PDCCH may be implemented in various forms according to the DCI format (Downlink Control Information format). One common PDCCH delivers one message in one form of DCI format. The DCI format includes the following information:

1. Allocation of sTTIs Transmission Frequency Resources for Downlink

The sTTIs transmission frequency bands for the downlink may be allocated equidistantly over the entire frequency band width to obtain frequency diversity. For example, the sTTIs transmission resources are arranged over the entire frequency band such that one resource block corresponds to one sTTI, and resource blocks for adjacent sTTIs are spaced from each other with intervals of two resource blocks. Alternatively, the sTTIs transmission resources are arranged over the entire frequency band such that two resource blocks correspond to one sTTI, and resource blocks for adjacent sTTIs are spaced from each other with intervals of four resource blocks. Furthermore, if a service provided in a corresponding sTTI requires higher reliability, the transmission resource for the sTTI may be arranged in a low-frequency portion of the downlink frequency band. Furthermore, since it is difficult to configure sTTIs in the center frequency band due to the PBCH (Physical Broadcast Channel), the PSS (Primary Synchronization Signal), and the SSS (Secondary Synchronization Signal) in the center frequency band, the frequency transmission band range for the sTTIs may be allocated except the center frequency band. In one example, the sTTIs transmission resources are arranged over the entire frequency band such that one resource block corresponds to one sTTI, and resource blocks for adjacent sTTIs are spaced from each other with intervals of two resource blocks, while the center frequency band used for the PBCH (Physical Broadcast Channel), the PSS (Primary Synchronization Signal), and the SSS (Secondary Synchronization Signal) is allocation-skipped. Furthermore, for specific reasons, frequency resources may be intensively arranged in specific frequency bands. The sTTIs transmission frequency band allocation using the common PDCCH of the downlink may be first applied to a subframe including the corresponding common PDCCH.

2. Indicator Indicating sTTIs Transmission Band Allocation Scheme for Downlink

Depending on the system characteristics, various sTTI transmission band allocation schemes for downlink may coexist in various ways. For example, a first scheme of allocating sTTI frequency bands at equal intervals from a first resource block to a tenth resource block and a second scheme of allocating frequency resources for sTTIs in a low frequency portion of the downlink frequency band may coexist. Alternatively, there may be a scheme of assigning sTTI bands to first, fifth, and tenth resource blocks. In this connection, switch between the sTTIs band allocation schemes may be indicated by 1 bit.

3. Specifying Frequency Range Available for STTIs Transmission Resource Allocation for Downlink There may be an indicator that indicate a frequency range available for STTIs transmission resource allocation for downlink, wherein STTIs transmission resources is allocated only in a specific frequency range instead of the entire frequency range. For example, when the STTIs transmission resources are arranged equidistantly, the indicator may include a first subcarrier where the equidistant resource arrangement starts and a second subcarrier where the equidistant resource arrangement ends.

4. Allocation of sTTIs Transmission Frequency Resources for Uplink

The above allocation of sTTIs transmission frequency resources for downlink may be equally applied to the allocation of sTTIs transmission frequency resources for uplink. That is, the sTTIs transmission frequency bands for the uplink may be allocated equidistantly over the entire frequency band width to obtain frequency diversity. Furthermore, by arranging the sTTI frequency bands in the low-frequency band portion of the uplink, the reduction in coverage due to transmission power reduction may be minimized. Furthermore, PUCCH and PDCCH regions may be separately specified. The sTTIs transmission frequency band allocation (i.e., allocation of the sPUSCH) for the uplink using the common PDCCH of the uplink may be basically applied to an x-th subframe after a subframe including the corresponding common PDCCH. In a typical system, x has a value of 3 or 4.

5. Indicator Indicating sTTIs Transmission Band Allocation Scheme for Uplink

The indicator indicating sTTIs transmission band allocation scheme for uplink may play the same role as the indicator indicating sTTIs transmission band allocation scheme for downlink. That is, depending on the system characteristics, various sTTI transmission band allocation schemes for uplink may coexist in various ways. For example, a first scheme of allocating sTTI frequency bands at equal intervals from a first resource block to a tenth resource block and a second scheme of allocating frequency resources for sTTIs in a low frequency portion of the uplink frequency band may coexist. Alternatively, there may be a scheme of assigning sTTI bands to first, fifth, and tenth resource blocks. In this connection, switch between the sTTIs band allocation schemes may be indicated by 1 bit.

6. Specifying Frequency Range Available for STTIs Transmission Resource Allocation for Uplink An indicator that indicate a frequency range available for STTIs transmission resource allocation for uplink may play the same role as the indicator that indicate a frequency range available for STTIs transmission resource allocation for downlink. That is, STTIs transmission resources for the uplink is allocated only in a specific frequency range instead of the entire uplink frequency range. For example, when the STTIs transmission resources are arranged equidistantly, the indicator that indicate a frequency range available for STTIs transmission resource allocation for uplink may include a first subcarrier where the equidistant resource arrangement starts and a second subcarrier where the equidistant resource arrangement ends.

7. Indicator Indicating Whether there is Resource Allocation Information for sTTIs in Subsequent Subframe The terminal devices that are allocated resources for sTTIs perform both decoding of the common PDCCH in the control region of the conventional TTI and decoding of the sPDCCH in the special symbol, thus consuming a lot of battery power. Therefore, an indicator indicating whether there exists or not transmission frequency band allocation information for sTTIs in a next subframe, all subsequent subframes up to an x-th subframe, or the x-th subframe after a current subframe including the current common PDCCH may be included into the DCI format of the current common PDCCH.

In one example, when the indicator is composed of 1 bit, '0' means that transmission frequency band allocation information for sTTIs in the next subframe exits, while '1' means that transmission frequency band allocation information for sTTIs in the next subframe is not present. In this connection, when the indicator '0' is transmitted, the terminal device may perform decoding to find a common PDCCH for the sTTIs frequency band allocation within the control region of the conventional TTI in the next subframe. On the other hand, when the indicator '1' is transmitted, the terminal device skips the next subframe.

In another example, when the indicator is composed of 2 bits, '00' means that a frequency band allocated for sTTIs in a first subsequent subframe may change; '01' means that a frequency band allocated for sTTIs in the first next subframe may not be changed and that a frequency band allocated for sTTIs in a second subsequent subframe may be changed; '10' means that a frequency band allocated for sTTIs in a third subsequent subframe may change; and '10' means that a frequency band allocated for sTTIs in a forth subsequent subframe may change.

Alternatively, without an explicit indicator, but using the C-RNTI, it may be indicated whether a common PDCCH for sTTIs in the next subframe is placed. In one example, in the current sTTIs, n C-RNTIs are informed to a UE to receive data. Based on respective C-RNTIs, a x-th subframe may be determined in which a common PDCCH for subsequent sTTIs is transmitted. For example, when the common PDCCH is decoded using a n-th C-RNTI, it may be confirmed that the common PDCCH for the subsequent sTTIs arrives in a n-th subframe. In this case, since the terminal device must perform decoding of common PDCCHs using the n C-RNTIs, complexity of the terminal device increases.

8. Allocation of Contention-Based Resource Region for Uplink

For fast uplink transmissions, the terminal device performs uplink communications using contention-based uplink resources and scheduling-based uplink resources. In this connection, this scheme may allocate the contention-based resource region for sTTIs without scheduling, that is, without UL-granting.

9. Specifying Time Resource Allocation Scheme for sTTI

A scheme for allocating time resources for sTTIs may be specified using various flexible sTTIs applicable according to the PCFICH included in the control region of the conventional TTI.

10. Indicator Indicating DCI Format of Common PDCCH

A bit in front of the DCI format of the common PDCCH may be used as an indicator to indicate a format of DCI.

11. sPCFICH (short Physical Format Indicator Channel)

The sPCFICH specifying a resource element of a control region (sCR) available for sPDCCH transmission in the sTTI may be transmitted via the common PDCCH.

In an actual system, the items or information 1 to 11 are too large in quantity to be included in the DCI format of the common PDCCH. Therefore, in order to solve this problem, RRC signaling may be used to convey some of the information or items 1 to 11. In one example, the indicator to indicate the sTTIs transmission frequency band allocation scheme for downlink or uplink may be notified via the RRC when it is determined that the urgency of this information is low. Thus, the terminal device may restore information of the common PDCCH. Alternatively, via the RRC, it may be notified whether the corresponding common PDCCH indicates the sTTI frequency band allocation for the downlink, the sTTI frequency band allocation for the uplink, the uplink contention-based resource allocation, etc. That is, there may be various cases as to which of the information or items 1 to 11 is or are transmitted using either the RRC or the common PDCCH.

In the following, embodiments for using the DCI format of the common PDCCH and the RRC for frequency band allocation for sTTIs will be described. In addition to the embodiments as described below, various methods for dynamically allocating frequency bands for sTTIs by appropriately utilizing the PDCCH of the RRC and the conventional TTI may be proposed.

Embodiment 1

Figure 9:
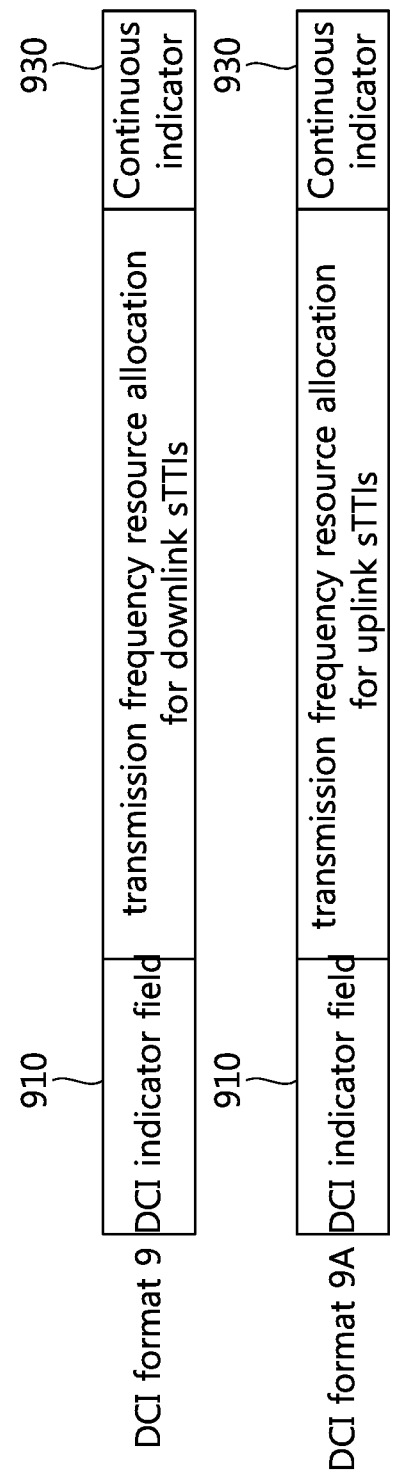
FIG. 9 shows an embodiment 1 of a common PDCCH DCI format for allocation of frequency bands for sTTIs.

FIG. 9 shows an embodiment 1 of a common PDCCH DCI format for allocation of frequency bands for sTTIs.

Common PDCCH transmission information and RRC transmission information to which the embodiment 1 described herein is applied may have the following features:

Common PDCCH transmission information: the allocation of sTTIs transmission frequency resources for the uplink/downlink, the indicator indicating whether there is resource allocation information for sTTIs in a subsequent subframe, and the indicator indicating the DCI format of the common PDCCH RRC transmission information: the indicator indicating the sTTIs transmission band allocation scheme for the downlink/uplink, the frequency range available for STTIs transmission resource allocation for downlink/uplink, the allocation of contention-based resource region for the uplink; the time resource allocation scheme for sTTI The RRC transmission information is cell-specific information and thus may be transmitted using a system information block. Among the common PDCCH transmission information and RRC transmission information as described above, information that is or are urgent or changes dynamically between subframes may be transmitted via the common PDCCH, while information that is or are low in urgency or is or are not changed between the subframes may be transmitted via the RRC.

FIG. 9 shows a common PDCCH DCI format when the embodiment 1 is applied. Referring to FIG. 9, an upper DCI format 9 and a lower DCI format 9A are different. When a value of an indicator field 910 at the frontmost position in the DCI format is 0, this indicates the DCI format 9. When a value of the indicator field 910 at the frontmost position in the DCI format is 1, this indicates the DCI format 9A. A subsequent field represents transmission frequency resource allocation for downlink sTTIs or transmission frequency resource allocation for uplink sTTIs. In this connection, in one example, in case of the DCI format 9, the subsequent field represents the transmission frequency resource allocation for downlink sTTIs. In the case of the DCI format 9A, the subsequent field represents the transmission frequency resource allocation for the uplink sTTIs. The last field has x larger than or equal to 1. This last field 930 indicates whether there is a change in the sTTI resource allocation for the downlink or uplink in the subsequent subframe by way of the common PDCCH. For example, if x=1 and the continuous indicator 930 is 1, this means that the sTTI transmission frequency resource allocation for uplink and downlink is not changed in the subsequent subframe. If the continuous indicator 930 is 0, this means that the sTTI transmission frequency resource allocation for uplink or downlink may be changed in the subsequent subframe. However, even in this case, the base station may not change the sTTI transmission frequency resource allocation. However, the terminal device must perform blind decoding of the common PDCCH of the subsequent subframe.

In this connection, the DCI format is used to allocate frequency resources used for the first downlink channels 711, 721, 712, 722, 713, 723 and 714 in FIG. 7. The continuous indicator 930 corresponds to an indicator indicating whether the frequency resources used for the first downlink channels 711, 721, 712, 722, 713, 723 and 714 in the current frame changes or not in a subsequent subframe after the current subframe. Furthermore, the DCI format indicates the contention-based uplink resources.

The RRC message indicates the frequency range available for the first downlink channels 711, 721, 712, 722, 713, 723 and 714 in FIG. 7. The RRC message indicates a scheme for allocating frequency resources used for the first downlink channels 711, 721, 712, 722, 713, 723, 714, and 724 in FIG. 7. Furthermore, the RRC message indicates symbols used for the first downlink channels 711, 721, 712, 722, 713, 723, 714, and 724 in FIG. 7. Furthermore, the RRC message indicates the contention-based uplink resources.

Embodiment 2 and Embodiment 3

Figure 10:
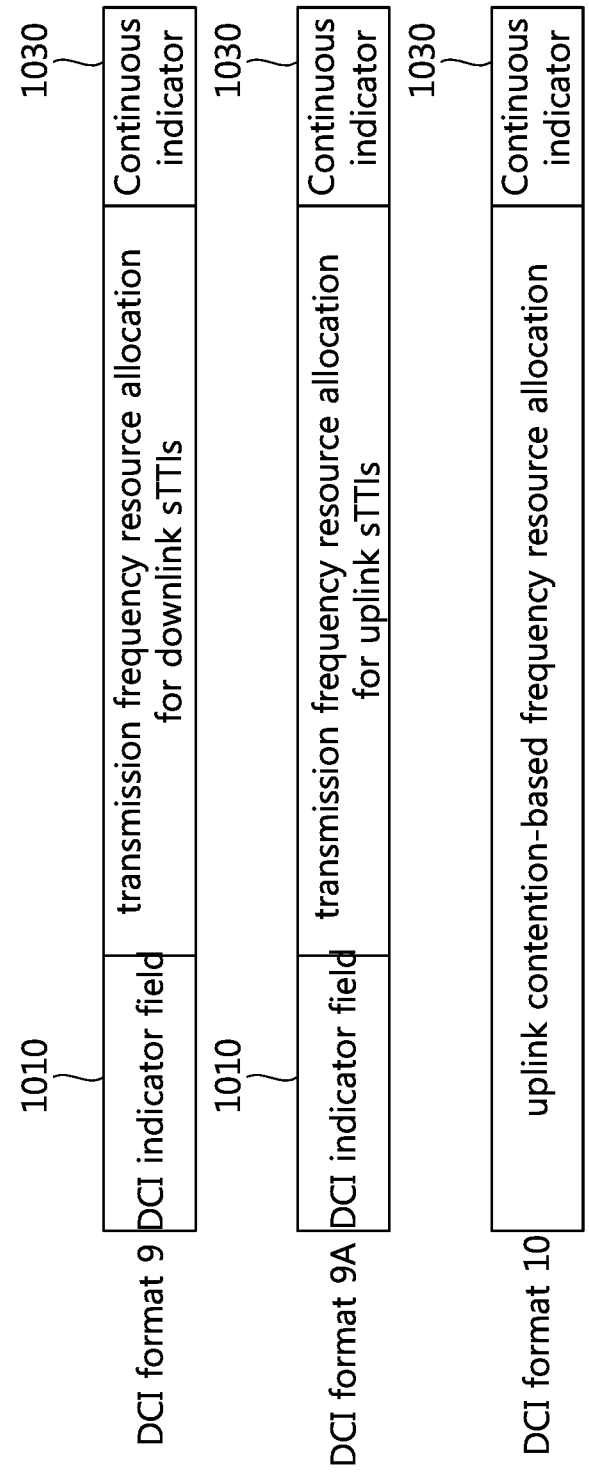
FIG. 10 shows an embodiment 2 of a common PDCCH DCI format for allocation of frequency bands for sTTIs.
Figure 11:
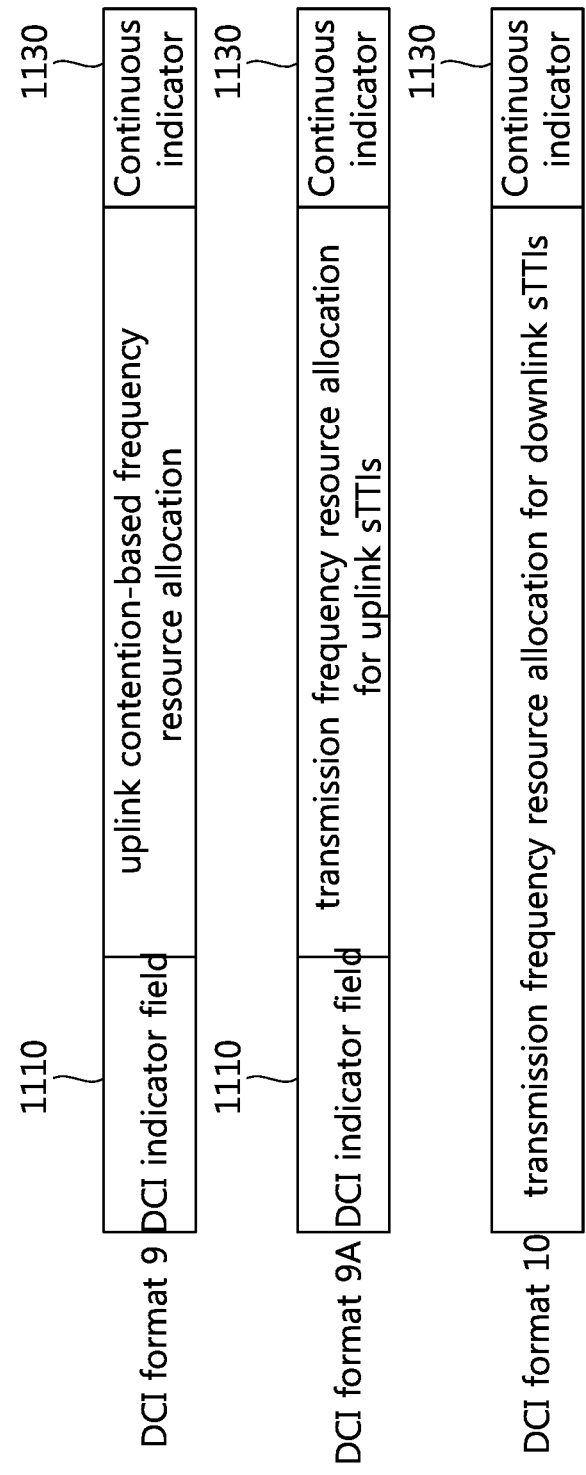
FIG. 11 shows an embodiment 3 of a common PDCCH DCI format for allocation of frequency bands for sTTIs.

FIG. 10 shows an embodiment 2 of a common PDCCH DCI format for allocation of frequency bands for sTTIs. FIG. 11 shows an embodiment 3 of a common PDCCH DCI format for allocation of frequency bands for sTTIs.

The embodiments 2 and 3 described herein have the following features:

Common PDCCH transmission information: the allocation of sTTIs transmission frequency resources for the uplink/downlink, the indicator indicating whether there is resource allocation information for sTTIs in a subsequent subframe, and the indicator indicating the DCI format of the common PDCCH, the allocation of contention-based resource region for the uplink RRC transmission information: the indicator indicating the sTTIs transmission band allocation scheme for the downlink/uplink, the frequency range available for STTIs transmission resource allocation for downlink/uplink, the time resource allocation scheme for sTTI The RRC transmission information is cell-specific information and thus may be transmitted using a system information block. Among the common PDCCH transmission information and RRC transmission information as described above, information that is or are urgent or changes dynamically between subframes may be transmitted via the common PDCCH, while information that is or are low in urgency or is or are not changed between the subframes may be transmitted via the RRC.

FIG. 10 shows a common PDCCH DCI format when the embodiment 2 is applied, wherein the allocations of sTTIs transmission frequency resources for the uplink/downlink are combined to each other. FIG. 11 shows a common PDCCH DCI format when the embodiment 3 is applied, wherein the allocation of sTTIs transmission frequency resources for the downlink is independent. Referring to each of FIG. 10 and FIG. 11, DCI formats 9, 9A, and 10 are different.

Referring to FIG. 10, in the embodiment 2, the sTTI transmission frequency resource allocations for the downlink/uplink may be identified from each other by an indicator field 1010 in the DCI format. The DCI formats 9 and 9A may be identified from each other by the indicator field 1010 in the DCI format. The DCI formats 9/9A and DCI format 10 may be identified with each other by the RRC signaling. In this connection, in one example, as for the DCI format 9, a subsequent field indicates transmission frequency resource allocation for downlink sTTIs. As for the DCI format 9A, a subsequent field represents the transmission frequency resource allocation for uplink sTTIs. As for the DCI format 10, the first field indicates uplink contention-based resource allocation. The DCI format 10 may be identified not by an indicator in the DCI format but by the RRC, and, thus, there is no indicator field 1010 in the DCI format 10.

The last field 1030 has x larger than or equal to 1. The last field 1030 indicates whether there is a change in the sTTI resource allocation for the downlink or uplink in the subsequent subframe by way of the common PDCCH. For example, if x=1 and the continuous indicator 1030 is 1, this means that the sTTI transmission frequency resource allocation for uplink and/or downlink is not changed in the subsequent subframe or the uplink contention-based resource allocation is not changed. If the continuous indicator 1030 is 0, this means that the sTTI transmission frequency resource allocation for uplink and/or downlink may be changed in the subsequent subframe or the uplink contention-based resource allocation may be changed. However, even in this case, the base station may not change the sTTI transmission frequency resource allocations and the uplink contention-based resource allocation. However, the terminal device must perform blind decoding of the common PDCCH of the subsequent subframe.

In this connection, the DCI format is used to allocate frequency resources used for the first downlink channels 711, 721, 712, 722, 713, 723 and 714 in FIG. 7. The continuous indicator 1030 corresponds to an indicator indicating whether the frequency resources used for the first downlink channels 711, 721, 712, 722, 713, 723 and 714 in the current frame changes or not in a subsequent subframe after the current subframe. Furthermore, the DCI format indicates the contention-based uplink resources.

The RRC message indicates the frequency range available for the first downlink channels 711, 721, 712, 722, 713, 723 and 714 in FIG. 7. The RRC message indicates a scheme for allocating frequency resources used for the first downlink channels 711, 721, 712, 722, 713, 723, 714, and 724 in FIG. 7. Furthermore, the RRC message indicates symbols used for the first downlink channels 711, 721, 712, 722, 713, 723, 714, and 724 in FIG. 7. Furthermore, the RRC message indicates the contention-based uplink resources.

Referring to FIG. 11, in the embodiment 3, the sTTI transmission frequency resource allocation for the uplink and the allocation of the contention-based resource region for uplink may be identified from each other by an indicator field 1110 in the DCI format. The DCI formats 9 and 9A may be identified from each other by the indicator field 1110 in the DCI format. The DCI formats 9/9A and DCI format 10 may be identified with each other by the RRC signaling. In this connection, in one example, as for the DCI format 9, a subsequent field indicates the allocation of the contention-based resource region for uplink. As for the DCI format 9A, a subsequent field represents the transmission frequency resource allocation for uplink sTTIs. As for the DCI format 10, the first field indicates the allocation of the contention-based resource region for downlink. The DCI format 10 may be identified not by an indicator in the DCI format but by the RRC, and, thus, there is no indicator field 1110 in the DCI format 10.

The last field 1130 has x larger than or equal to 1. The last field 1130 indicates whether there is a change in the sTTI resource allocation for the uplink or in the allocation of the contention-based resource region for uplink in the subsequent subframe by way of the common PDCCH. For example, if x=1 and the continuous indicator 1130 is 1, this means that the sTTI transmission frequency resource allocation for uplink and/or downlink is not changed in the subsequent subframe or the uplink contention-based resource allocation is not changed in the subsequent subframe. If the continuous indicator 1130 is 0, this means that the sTTI transmission frequency resource allocation for uplink and/or downlink may be changed in the subsequent subframe or the uplink contention-based resource allocation may be changed in the subsequent subframe. However, even in this case, the base station may not change the sTTI transmission frequency resource allocations and the uplink contention-based resource allocation. However, the terminal device must perform blind decoding of the common PDCCH of the subsequent subframe.

In this connection, the DCI format is used to allocate frequency resources used for the first downlink channels 711, 721, 712, 722, 713, 723 and 714 in FIG. 7. The continuous indicator 1130 corresponds to an indicator indicating whether the frequency resources used for the first downlink channels 711, 721, 712, 722, 713, 723 and 714 in the current frame changes or not in a subsequent subframe after the current subframe. Furthermore, the DCI format indicates the contention-based uplink resources.

The RRC message indicates the frequency range available for the first downlink channels 711, 721, 712, 722, 713, 723 and 714 in FIG. 7. The RRC message indicates a scheme for allocating frequency resources used for the first downlink channels 711, 721, 712, 722, 713, 723, 714, and 724 in FIG. 7. Furthermore, the RRC message indicates symbols used for the first downlink channels 711, 721, 712, 722, 713, 723, 714, and 724 in FIG. 7. Furthermore, the RRC message indicates the contention-based uplink resources.

<Channel Design to Maintain Uniform Number of Resource Elements in Control Region (sCR) between sTTIs>

Herein, FIG. 7 shows that the number of resource elements included in the data region used to transmit the sPDSCH and the resource elements in the control region (sCR) vary between the sTTIs. The change in the number of resource elements in the data region used to transmit the sPDSCH leads to the adjustment of the transport block size transmitted in the sPDSCH. Thus, this may not raise other problems except for the reduction in the transmission efficiency. However, the change in the control region (sCR) of the sTTI leads to a change in resources allocatable to the control region (sCR) of the sTTI, thereby causing the design of the control region (sCR) and the operation of the UE to be more complex. Therefore, the following describes how to arrange the resources in the control region (sCR) of the sTTI, and in the data region used to transmit the sPDSCH between the sTTIs. In the following, the applicants describe how to allocate resource elements to the control region (sCR) of the sTTI based on the corresponding sTTI, and to use the remaining resource elements as a reference signal or as the sPDSCH.

Conventionally, a resource element corresponding to or allocated to a cell-specific reference signal (CRS) is not allocated to the control region (sCR) of the sTTI, so that the control region (sCR) mapping for the sTTI can be matched between different sTTIs. This makes it possible to simplify the system design and obtain more sPDSCHs.

Furthermore, for the purpose of securing more sPDSCHs, the resource element allocated to the control region (sCR) of the sTTI may be specified according to the value of sPCFICH (short PCFICH). The resource element arrangement scheme in the control region (sCR) of the sTTI may be an equidistant spacing arrangement to obtain more frequency diversity.

In the following, each embodiment regarding frequency resource allocation in the control region (sCR) of the sTTI using the above-described method will be described.

Embodiment 4

Figure 12:
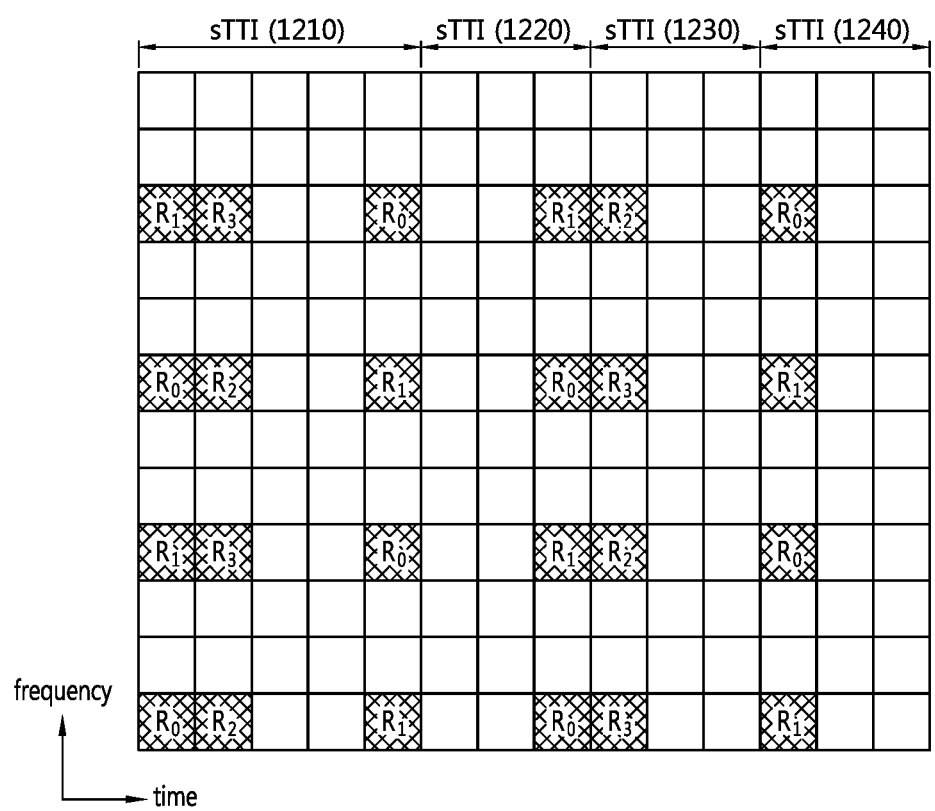
FIG. 12 shows an embodiment 4 for allocating frequency resources in a control region (sCR) of a sTTI.

FIG. 12 shows an embodiment 4 regarding frequency resources allocation in the control region (sCR) of the sTTI.

FIG. 12 shows sTTI arrangement when a first sTTI 1210 does not have a separate special symbol, i.e., when the first sTTI 1210 shares the control region of the conventional TTI. However, this is only an example of the sTTI arrangement. The present invention is not limited thereto. Since the control region of the conventional TTI is allocated to the first sTTI 1210, the control region (sCR) of the sTTI is not separately allocated to the first sTTI 1210. In each of second to fourth sTTIs 1220, 1230 and 1240, each of resource elements previously corresponding to or allocated to cell-specific reference signals is not allocated to the corresponding control region (sCR) of the corresponding sTTI, so that the control region (sCR) mappings of the sTTIs may match with each other between the second to fourth sTTIs 1220, 1230 and 1240.

Embodiment 5

Figure 13:
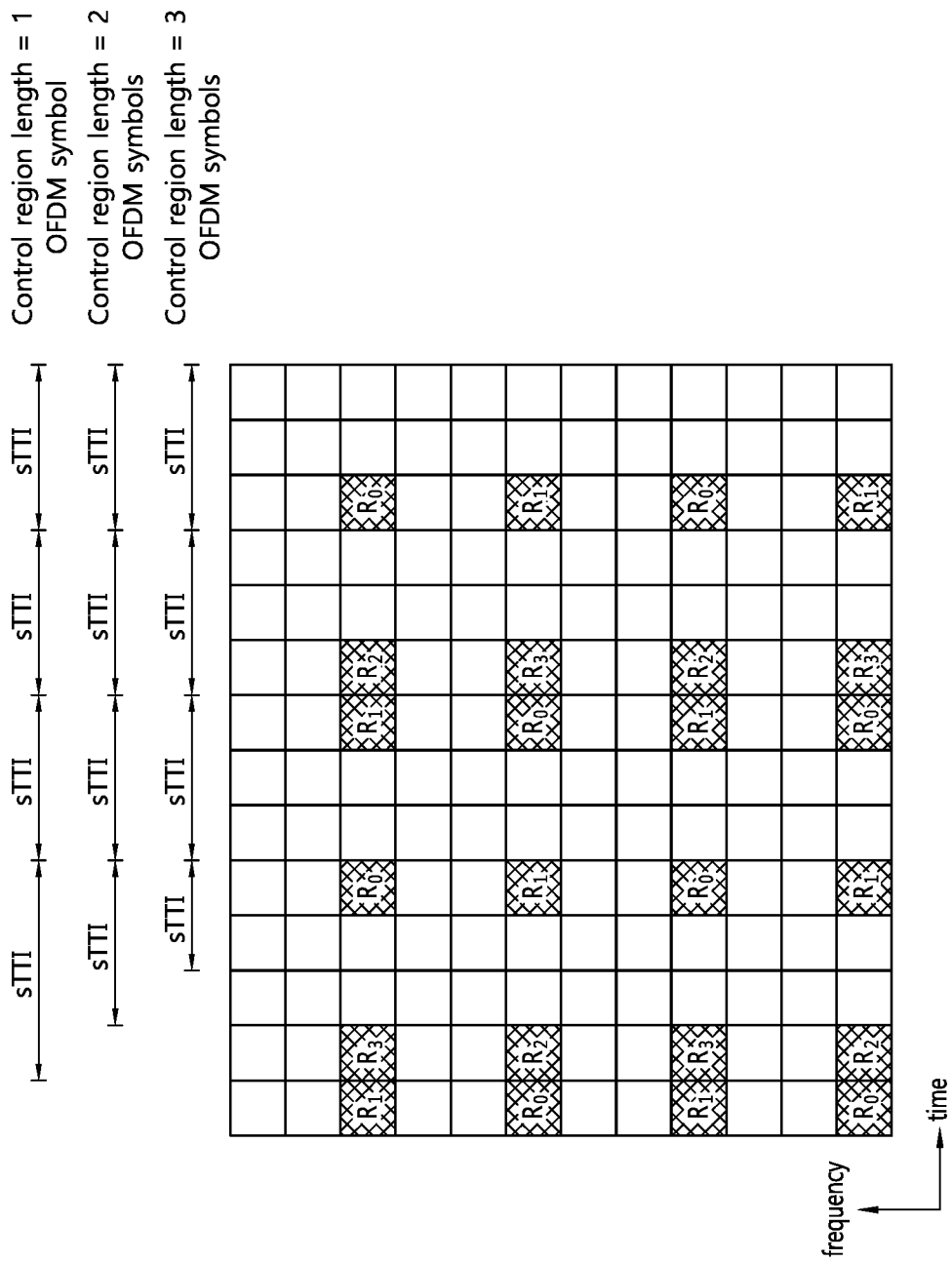
FIG. 13 shows an embodiment 5 for allocating frequency resources to a control region (sCR) of a sTTI.

FIG. 13 shows an embodiment 5 regarding frequency resources allocation in the control region (sCR) of the sTTI.

FIG. 13 shows sTTI arrangement when the first sTTI has a special symbol and the length of the control region of the conventional TTI corresponds to one OFDM symbol or two OFDM symbols or three OFDM symbols. However, this is only an example of the sTTI arrangement. The present invention is not limited thereto. In this connection, the first control region (sCR) of the sTTI is allocated to the first sTTI. In each of first to fourth sTTIs, each of resource elements previously corresponding to or allocated to cell-specific reference signals is not allocated to the corresponding control region (sCR) of the corresponding sTTI, so that the control region (sCR) mappings of the sTTIs may match with each other between the first to fourth sTTIs.

Embodiments 6 and 7

Figure 14:
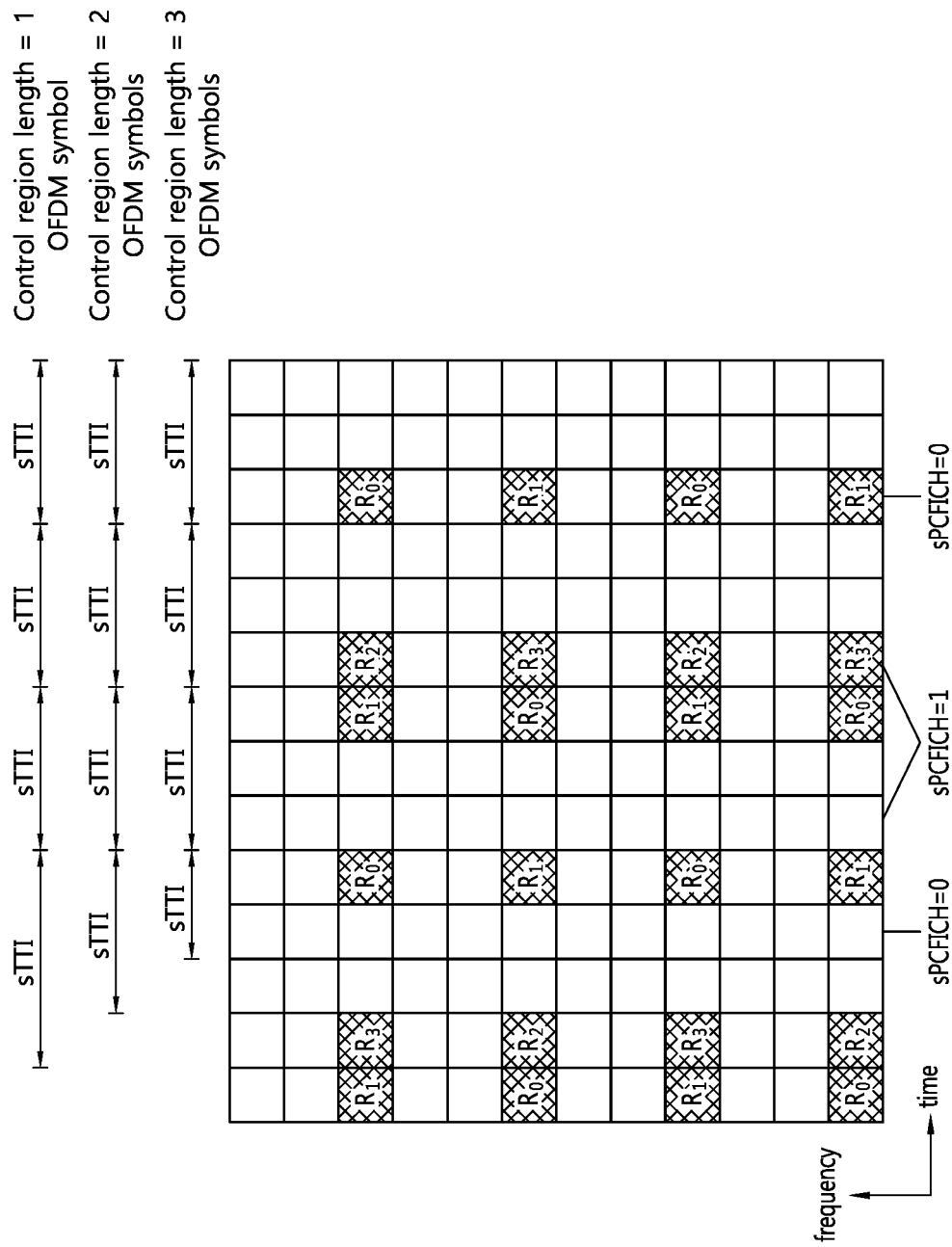
FIG. 14 shows an embodiment 6 for allocating frequency resources to a control region (sCR) of a sTTI using a sPCFICH based on the corresponding sTTI.
Figure 15:
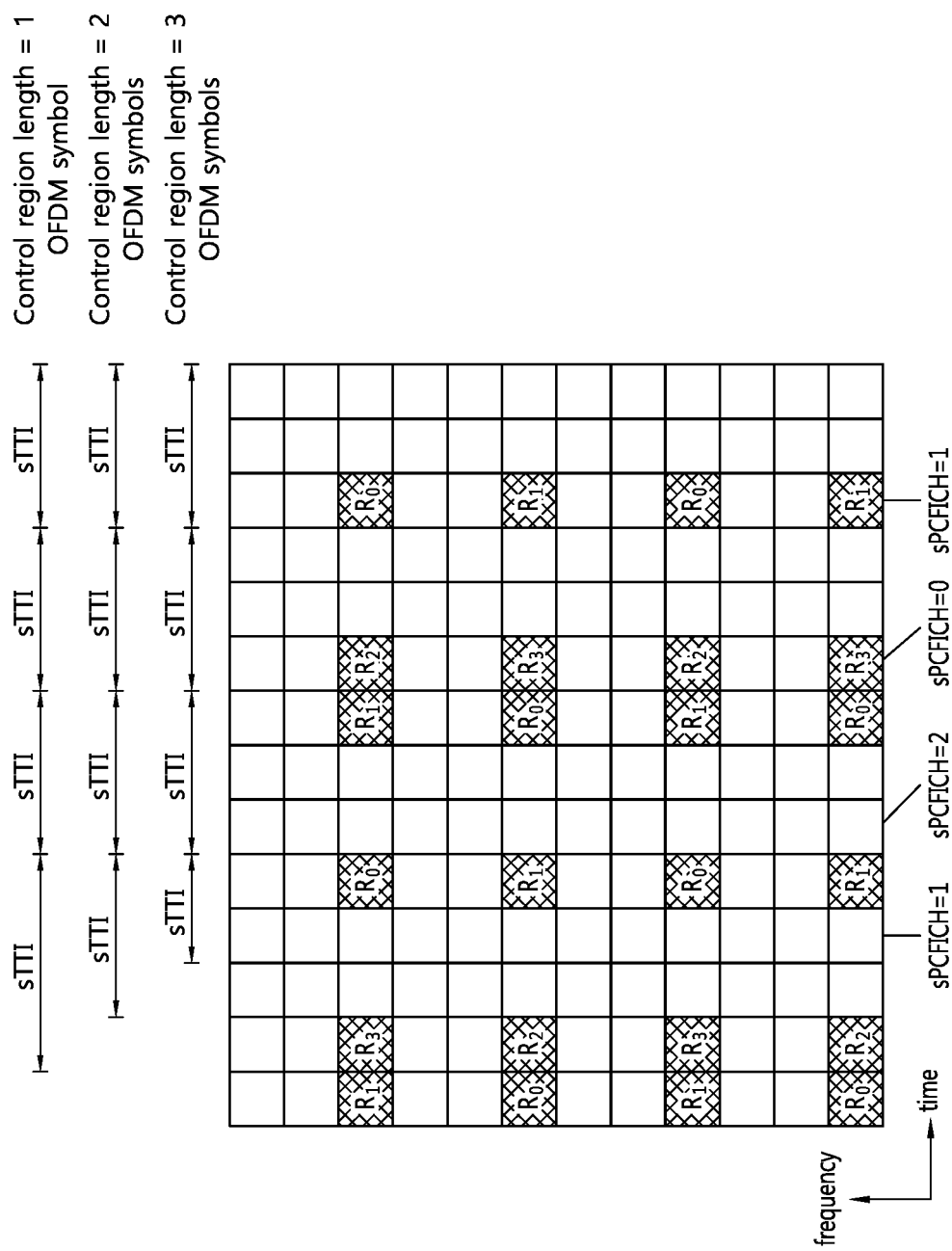
FIG. 15 shows an embodiment 7 for allocating frequency resources to a control region (sCR) of a sTTI using a sPCFICH based on the corresponding sTTI.

FIG. 14 shows an embodiment 6 for allocating frequency resources to a control region (sCR) of a sTTI using a sPCFICH based on the corresponding sTTI. FIG. 15 shows an embodiment 7 for allocating frequency resources to a control region (sCR) of a sTTI using a sPCFICH based on the corresponding sTTI.

FIG. 14 and FIG. 15 show the sTTI arrangements when the first sTTI has a special symbol and the length of the control region of the conventional TTI corresponds to one OFDM symbol or two OFDM symbols or three OFDM symbols as in FIG. 13. However, this is only an example of the sTTI arrangement. The present invention is not limited thereto.

Referring to FIG. 14, it may be seen that frequency resources are allocated to the control region (sCR) of the corresponding sTTI based on the corresponding sTTI by transmitting sPCFICH using the specified resources of the control region (sCR) of the corresponding sTTI. Accordingly, based on the corresponding sTTI, the region used for transmitting the sPDSCH may also be changed. Alternatively, it is possible to arrange the sPCFICHs only into the odd-numbered sTTIs, i.e., the first and third sTTIs in this example, and, thus, change the region used to transmit the sPDSCH in a slot basis in a corresponding subframe.

FIG. 14 illustrates a case where sPCFICH is 0 or 1. For example, in each of the first and fourth sTTIs, sPCFICH=0, whereby, four resource elements may be allocated, at equal intervals, to the control region (sCR) of each sTTI. In each of second and third sTTIs, sPCFICH=1, whereby, eight resource elements may be allocated, at equal intervals, to the control region (sCR) of each sTTI. This is just one example of allocating frequency resources to the control region (sCR) of the sTTI based on the corresponding sTTI. The present invention is not limited thereto.

In this connection, the frequency bands respectively allocated to the control regions 711, 712, 713, and 714 of the sTTIs of FIG. 7 may be respectively indicated by the sPCFICH contained in the control regions 711, 712, 713, 714 of the sTTIs in FIG. 7. Since sPCFICH=1 in the second sTTI as described above, 8 resource elements may be allocated at regular intervals to the control region 712 of the second sTTI in FIG. 7.

Referring to FIG. 15, it may be seen that frequency resources are allocated to the control region (sCR) of the corresponding sTTI based on the corresponding sTTI by transmitting sPCFICH using the specified resources of the control region (sCR) of the corresponding sTTI. Accordingly, based on the corresponding sTTI, the region used for transmitting the sPDSCH may also be changed. Alternatively, it is possible to arrange the sPCFICHs only into the odd-numbered sTTIs, i.e., the first and third sTTIs in this example, and, thus, change the region used to transmit the sPDSCH in a slot basis in a corresponding subframe.

FIG. 15 illustrates a case where sPCFICH is 0 or 1 or 2. For example, in each of the first and fourth sTTIs, sPCFICH=1, whereby, four resource elements may be allocated, at equal intervals, to the control region (sCR) of each sTTI. In the second sTTI, sPCFICH=2, whereby, eight resource elements may be allocated, at equal intervals, to the control region (sCR) of the second sTTI. In the third sTTI, sPCFICH=0, whereby, two resource elements may be allocated, at equal intervals, to the control region (sCR) of the third sTTI. This is just one example of allocating frequency resources to the control region (sCR) of the sTTI based on the corresponding sTTI. The present invention is not limited thereto.

In this connection, the frequency bands respectively allocated to the control regions 711, 712, 713, and 714 of the sTTIs of FIG. 7 may be respectively indicated by the sPCFICH contained in the control regions 711, 712, 713, 714 of the sTTIs in FIG. 7. Since sPCFICH=2 in the second sTTI as described above, 8 resource elements may be allocated at regular intervals to the control region 712 of the second sTTI in FIG. 7.

Embodiments 8, 9, and 10

Figure 16:
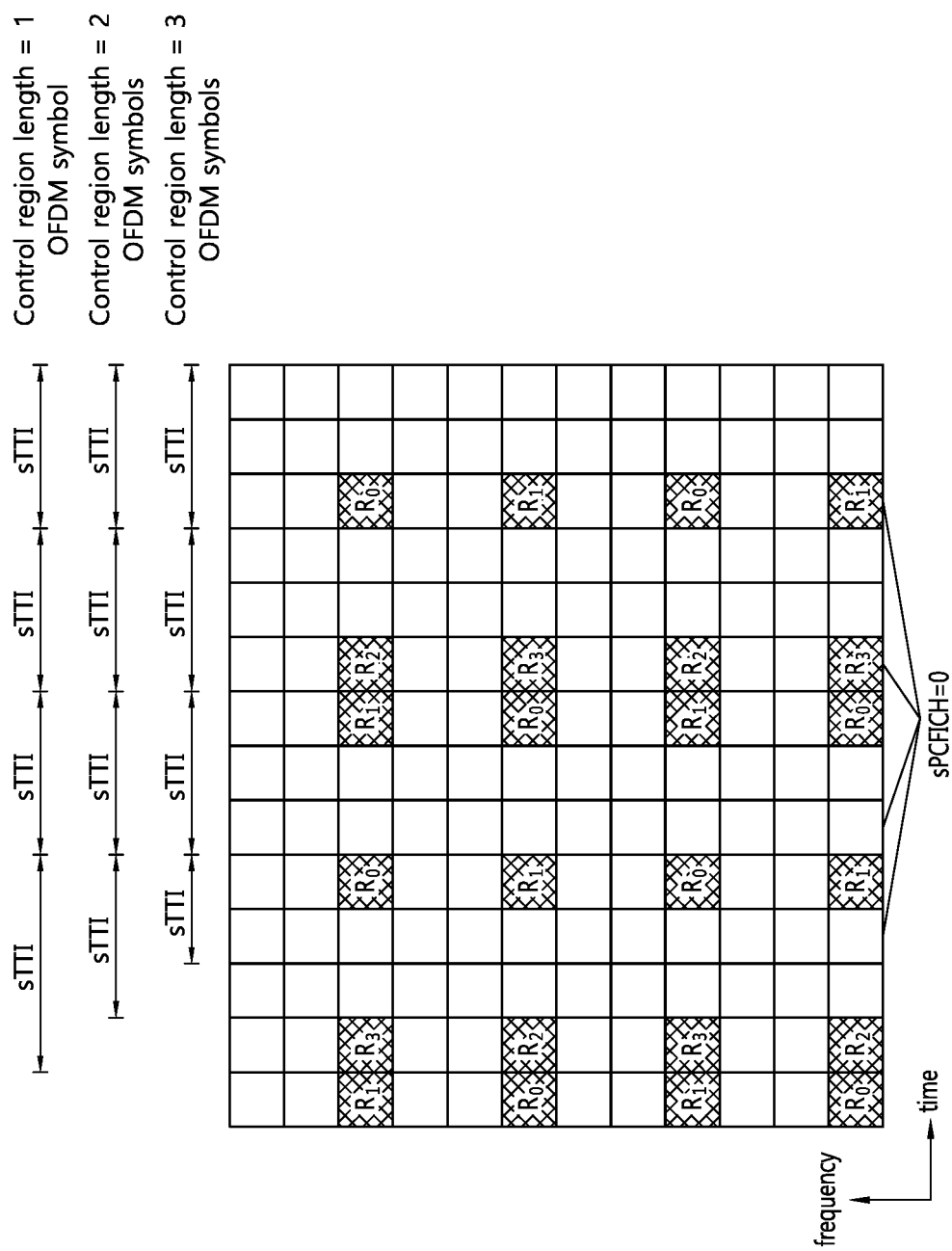
FIG. 16 shows an embodiment 8 for allocating frequency resources to a control region (sCR) of a sTTI using a sPCFICH based on a corresponding TTI.
Figure 17:
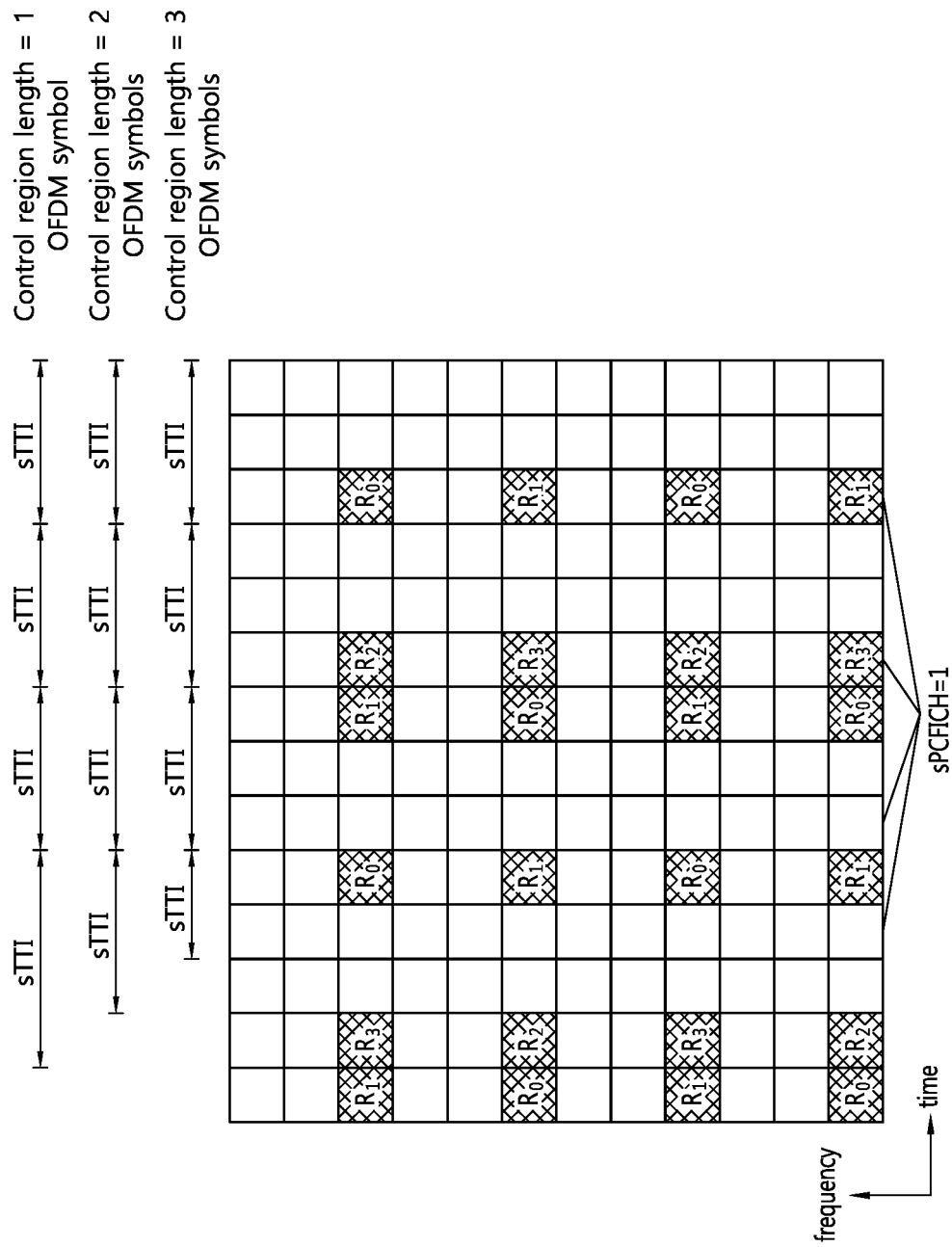
FIG. 17 shows an embodiment 9 for allocating frequency resources to a control region (sCR) of a sTTI using a sPCFICH based on a corresponding TTI.
Figure 18:
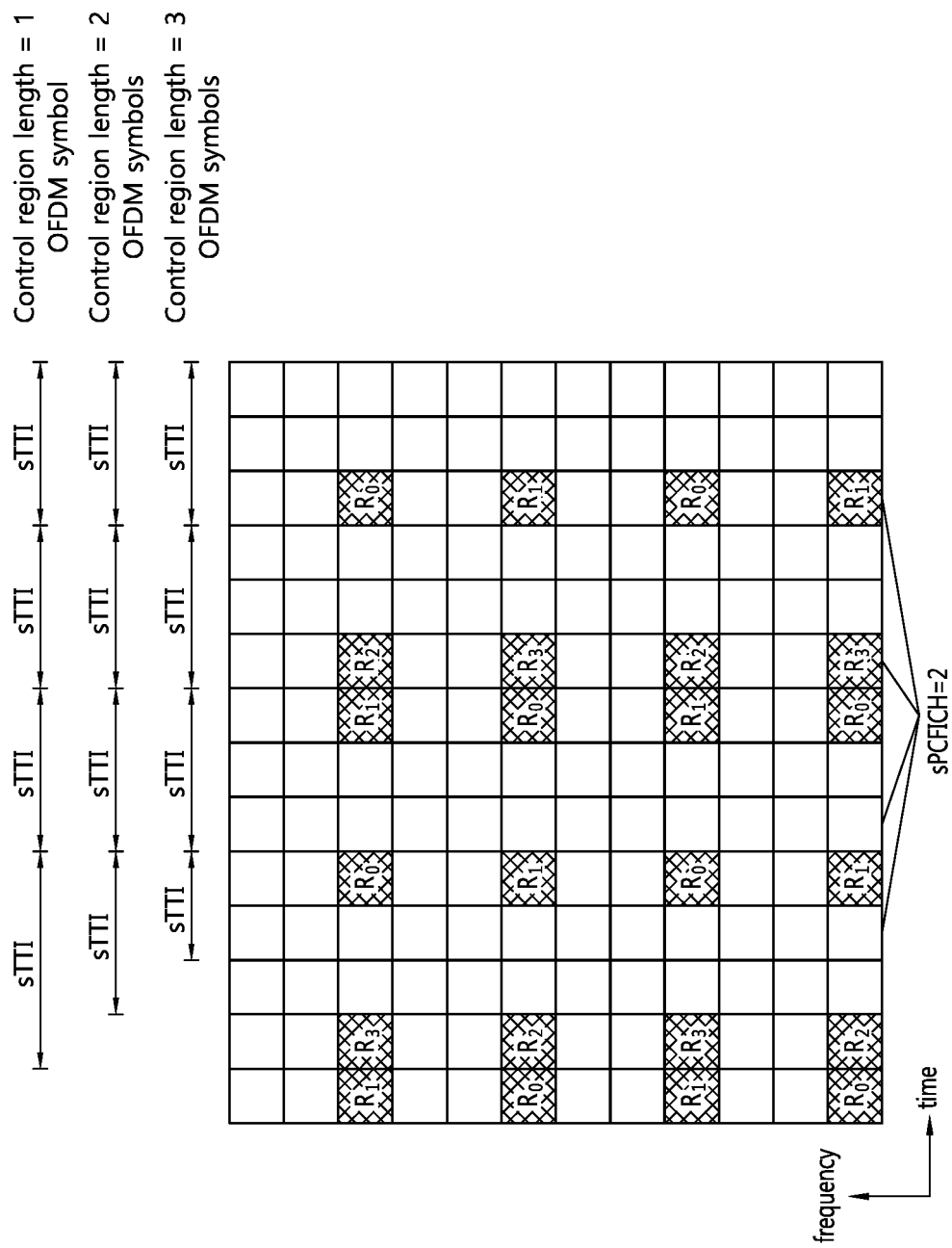
FIG. 18 shows an embodiment 10 for allocating frequency resources to a control region (sCR) of a sTTI using a sPCFICH based on a corresponding TTI.

FIG. 16 shows an embodiment 8 for allocating frequency resources to a control region (sCR) of a sTTI using a sPCFICH based on a corresponding TTI. FIG. 17 shows an embodiment 9 for allocating frequency resources to a control region (sCR) of a sTTI using a sPCFICH based on a corresponding TTI. FIG. 18 shows an embodiment 10 for allocating frequency resources to a control region (sCR) of a sTTI using a sPCFICH based on a corresponding TTI.

FIG. 16, FIG. 17 and FIG. 18 show the sTTI arrangements when the first sTTI has a special symbol and the length of the control region of the conventional TTI corresponds to one OFDM symbol or two OFDM symbols or three OFDM symbols as in FIG. 13. However, this is only an example of the sTTI arrangement. The present invention is not limited thereto.

In the embodiments 8, 9 and 10 as shown at FIG. 16, FIG. 17, and FIG. 18, by including sPCFICH in the common PDCCH of the conventional TTI, unlike the embodiment 6 and embodiment 7, frequency resources may be allocated the control region (sCR) of the sTTI not based on the corresponding sTTI but based on the corresponding TTI. In this case, the frequency resource arrangement to the control region (sCR) of sTTI may be identical between the sTTIs in the same subframe.

In FIG. 16, sPCFICH=0 in all of the first to fourth sTTIs, so that for each sTTIs in the subframe, two resource elements are allocated at regular intervals to the control region (sCR) of each sTTI. In this connection, the frequency bands respectively allocated to the control regions 711, 712, 713, and 714 of the sTTIs of FIG. 7 may be respectively indicated by the sPCFICH contained in a control region 710 of the conventional TTI in FIG. 7. Since sPCFICH=0 in the second sTTI as described above, 2 resource elements may be allocated at regular intervals to the control region 712 of the second sTTI in FIG. 7.

In FIG. 16, sPCFICH=1 in all of the first to fourth sTTIs, so that for each sTTIs in the subframe, four resource elements are allocated at regular intervals to the control region (sCR) of each sTTI. In this connection, the frequency bands respectively allocated to the control regions 711, 712, 713, and 714 of the sTTIs of FIG. 7 may be respectively indicated by the sPCFICH contained in a control region 710 of the conventional TTI in FIG. 7. Since sPCFICH=1 in the second sTTI as described above, four resource elements may be allocated at regular intervals to the control region 712 of the second sTTI in FIG. 7.

In FIG. 18, sPCFICH=2 in all of the first to fourth sTTIs, so that for each sTTIs in the subframe, 8 resource elements are allocated at regular intervals to the control region (sCR) of each sTTI. In this connection, the frequency bands respectively allocated to the control regions 711, 712, 713, and 714 of the sTTIs of FIG. 7 may be respectively indicated by the sPCFICH contained in a control region 710 of the conventional TTI in FIG. 7. Since sPCFICH=1 in the second sTTI as described above, 8 resource elements may be allocated at regular intervals to the control region 712 of the second sTTI in FIG. 7.

Alternatively, unlike the embodiment 8, embodiment 9, and embodiment 10, a following scheme may be executed. The resources of the common PDCCH are limited. Thus, it is not necessary to include sPCFICH in the common PDCCH. Rather, the frequency resources allocation to the control region (sCR) of the sTTI may be made in association with the PCFICH value contained in the control region of the conventional TTI. In one example, the size of the sPDSCH also changes according to the length of the flexible sTTI having a variable length varying depending on the PCFICH value included in the control region of the conventional TTI. Therefore, in order to secure lager sPDSCH, small sized resources may be allocated to smaller sTTI control region (sCR).

Figure 19:
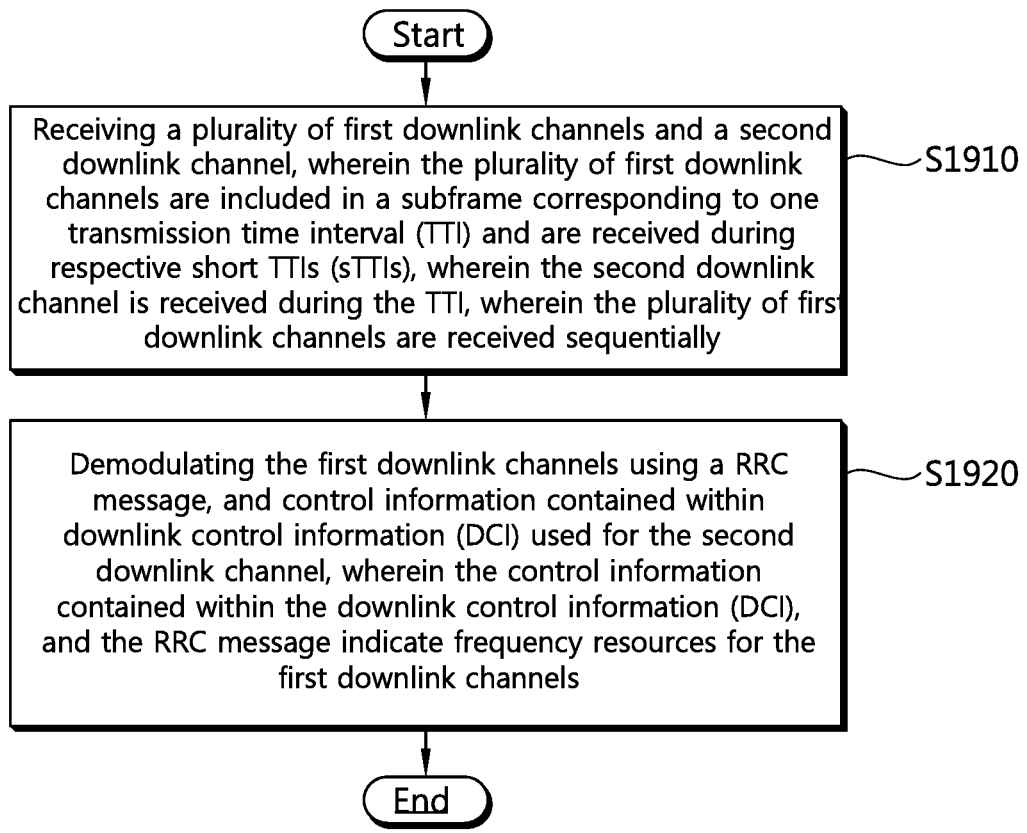
FIG. 19 shows a flowchart of a method of performing communications by dynamically allocating frequency resources to short TTIs.

FIG. 19 shows a flowchart of a method of performing communications by dynamically allocating frequency resources to short TTIs.

First, terminologies will be defined. A sTTI corresponds to a time interval shorter than a time interval of the conventional TTI and contained within the conventional TTI. Each first downlink channel includes a sPDSCH that is received during a sTTI (short TTI) and a sPDCCH that is used to schedule the sPDSCH. A second downlink channel includes a PDSCH received during the conventional TTI, and a common PDCCH of the conventional TTI used to schedule the PDSCH. Demodulating a channel corresponds to decoding a channel.

In this method, in an operation 1910, a plurality of the first downlink channels included in a subframe corresponding to one conventional TTI and received during the sTTI are received, and the second downlink channel received during the conventional TTI is received. The plurality of the first downlink channels are received sequentially. That is, in the first sTTI, second sTTI, and third sTTI in this order, the first downlink channels are received.

In this method, in an operation 1920, the first downlink channels are demodulated using a RRC message, and control information contained within downlink control information (DCI) used for the second downlink channel. The downlink control information (DCI) indicates DCI of the common PDCCH, and, thus, the control information contained within the downlink control information (DCI) corresponds to transmission information of the common PDCCH. Further, the control information contained within the downlink control information (DCI) and the RRC message indicate the frequency resources for the first downlink channels. That is, the common PDCCH and the RRC message indicate information on a frequency band during a corresponding sTTI. Furthermore, the plurality of the first downlink channel and the second downlink channel are allocated to different frequency bands, that is, different subbands.

As a result, in order to demodulate the plurality of the first downlink channels received during the sTTI, using the common PDCCH by way of the DCI format and scheduling by way of the RRC may be utilized as appropriate.

Figure 20:
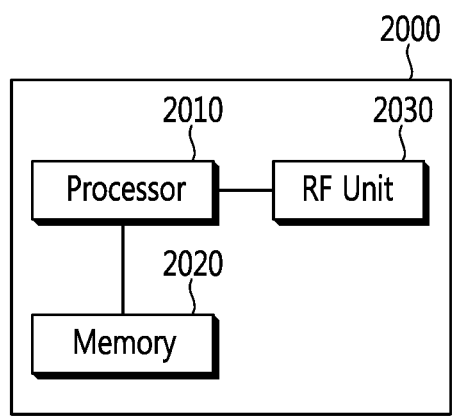
FIG. 20 is a block diagram showing a device for wireless communication for implementing an embodiment of the present invention.

FIG. 20 is a block diagram showing a device for wireless communication for implementing an embodiment of the present invention.

A device 2000 for wireless communication includes a processor 2010, a memory 2020 and a radio frequency (RF) unit 2030.

The processor 2010 may be configured to implement proposed functions, procedures and/or methods described in this description. Layers of the radio interface protocol may be implemented in the processor 2010. The processor 2010 may handle a procedure explained above. The memory 2020 is operatively coupled with the processor 2010, and the RF unit 2030 is operatively coupled with the processor 2010.

The processor 2010 may include application-specific integrated circuit (ASIC), other chipset, logic circuit and/or data processing device. The memory 2020 may include read-only memory (ROM), random access memory (RAM), flash memory, memory card, storage medium and/or other storage device. The RF unit 2030 may include baseband circuitry to process radio frequency signals. When the embodiments are implemented in software, the techniques described herein can be implemented with modules (e.g., procedures, functions, and so on) that perform the functions described herein. The modules can be stored in memory 2020 and executed by processor 2010. The memory 2020 can be implemented within the processor 2010 or external to the processor 2010 in which case those can be communicatively coupled to the processor 2010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

Furthermore, the technical concepts in the described embodiments may be identically applied, and embodiments in which the number of subframes and the number of special symbols within a radio frame are differently defined may be included in the technical scope of this specification.

What is claimed is:

1. A method for receiving, by a user equipment (UE), short downlink (DL) channels including a first short DL channel and a second short DL channel in a wireless communication system, the method comprising:
   receiving a reference DL channel including a Physical Downlink Control Channel (PDCCH) from a base station (BS) during a transmission time interval (TTI), wherein downlink control information (DCI) is received through the PDCCH; and
   receiving the first short DL channel during a first short TTI (sTTI) and the second short DL channel during a second sTTI based on the DCI,
   wherein the first sTTI and the second sTTI are included in the TTI,
   wherein the DCI includes information on a first frequency resource for the first short DL channel and the second short DL channel,
   wherein the first short DL channel includes a first short Physical Downlink Control Channel (sPDCCH) and a first short Physical Downlink Shared Channel (sPDSCH) scheduled using the first sPDCCH,
   wherein the second short DL channel includes a second sPDCCH and a second sPDSCH scheduled using the second sPDCCH,
   wherein the first sPDCCH and the second sPDCCH are allocated to the first frequency resource,
   wherein the PDCCH is allocated to a second frequency resource different from the first frequency resource,
   wherein a first symbol of each of the first short DL channel and the second short DL channel includes a short Physical Control Format Indicator Channel (sPCFICH), wherein each sPCFICH indicates a resources region used for transmitting a control region for each of the first short DL channel and the second short DL channel, and
   wherein the sPCFICH is arranged only in a first Orthogonal Frequency Division Multiplexing (OFDM) symbol among the plurality of OFDM symbols of odd numbered sTTIs of the first and second sTTIs.

2. The method of claim 1, wherein the reference DL channel further includes a Physical Downlink Shared Channel (PDSCH) scheduled using the PDCCH.

3. The method of claim 1, further comprising:
   receiving a radio resource control (RRC) message from the BS, wherein the RRC message includes allocation information on the first short DL channel and the second short DL channel,
   wherein the DCI includes information on whether the first frequency resource for the first short DL channel and the second short DL channel in a current subframe are allocated in a subsequent subframe, and
   wherein the RRC message includes information on a scheme for allocating the first short DL channel and the second short DL channel to the first frequency resource.

4. The method of claim 3, wherein the RRC message includes information on an uplink resource region that is accessed in a contention-based manner.

5. The method of claim 3, wherein the DCI includes information on an uplink resource region that is accessed in a contention-based manner.

6. The method of claim 3, wherein the RRC message includes information on time resources for the first sTTI and the second sTTI.

7. The method of claim 1, wherein at least one symbol among a plurality of symbols for transmitting each of the first short DL channel and the second short DL channel includes a cell-specific reference signal (CRS).

8. The method of claim 1, wherein each of the first short DL channel and the second short DL channel is received using the same number of symbols.

9. A user equipment (UE) for receiving short downlink (DL) channels including a first short DL channel and a second short DL channel in a wireless communication system, UE comprising:
- a transmitter and a receiver; and
- a processor operatively coupled to the transmitter and receiver, wherein the processor is configured to:
- control the receiver to receive a reference DL channel including a Physical Downlink Control Channel (PDCCH) from a base station (BS) during a transmission time interval (TTI),
- wherein downlink control information (DCI) is received through the PDCCH; and
- control the receiver to receive the first short DL channel during a first short TTI (sTTI) and the second short DL channel during a second sTTI based on the DCI,
- wherein the first sTTI and the second sTTI are included in the TTI,
- wherein the DCI includes information on a first frequency resource for the first short DL channel and the second short DL channel,
- wherein the first short DL channel includes a first short Physical Downlink Control Channel (sPDCCH) and a first short Physical Downlink Shared Channel (sPDSCH) scheduled using the first sPDCCH,
- wherein the second short DL channel includes a second sPDCCH and a second sPDSCH scheduled using the second sPDCCH,
- wherein the first sPDCCH and the second sPDCCH are allocated to the first frequency resource,
- wherein the PDCCH is allocated to a second frequency resource different from the first frequency resource,
- wherein a first symbol of each of the first short DL channel and the second short DL channel includes a short Physical Control Format Indicator Channel (sPCFICH), wherein each sPCFICH indicates a resources region used for transmitting a control region for each of the first short DL channel and the second short DL channel, and
- the sPCFICH is arranged only in a first Orthogonal Frequency Division Multiplexing (OFDM) symbol among the plurality of OFDM symbols of odd numbered sTTIs of the first and second sTTIs.

* * * * *